US008466958B2

(12) United States Patent
Shirota et al.

(10) Patent No.: US 8,466,958 B2
(45) Date of Patent: Jun. 18, 2013

(54) MICROSCOPE SYSTEM THAT IS CAPABLE OF ELECTRICALLY CHANGING AN OBSERVATION STATE OF A SAMPLE

(75) Inventors: Tetsuya Shirota, Tokyo (JP); Yasuko Ishii, Tokyo (JP); Izumi Sakuma, Tokyo (JP)

(73) Assignee: Olympus Corporation, Tokyo (JP)

( * ) Notice: Subject to any disclaimer, the term of this patent is extended or adjusted under 35 U.S.C. 154(b) by 374 days.

(21) Appl. No.: 12/833,137

(22) Filed: Jul. 9, 2010

(65) Prior Publication Data
US 2011/0013010 A1    Jan. 20, 2011

(30) Foreign Application Priority Data
Jul. 14, 2009    (JP) ................... 2009-165981

(51) Int. Cl.
*H04N 7/18*    (2006.01)
(52) U.S. Cl.
USPC .................... 348/77; 348/78; 348/62
(58) Field of Classification Search
USPC ................. 348/77–78, 62
See application file for complete search history.

(56) References Cited

U.S. PATENT DOCUMENTS

| | | | | |
|---|---|---|---|---|
| 5,703,714 | A * | 12/1997 | Kojima | 359/368 |
| 6,133,561 | A * | 10/2000 | Toshimitsu et al. | 250/201.3 |
| 7,577,484 | B2 | 8/2009 | Fiedler et al. | |
| 7,906,762 | B2 * | 3/2011 | Bierhoff et al. | 250/310 |
| 2002/0009220 | A1 * | 1/2002 | Tanaka | 382/145 |
| 2004/0108459 | A1 * | 6/2004 | Furukawa et al. | 250/311 |
| 2005/0041282 | A1 * | 2/2005 | Rudolph et al. | 359/368 |
| 2005/0270640 | A1 * | 12/2005 | Miki | 359/381 |
| 2007/0206275 | A1 * | 9/2007 | Hemmer et al. | 359/385 |
| 2008/0155452 | A1 * | 6/2008 | Mizusawa | 715/772 |
| 2009/0002323 | A1 * | 1/2009 | Shiroishi et al. | 345/173 |
| 2009/0052022 | A1 * | 2/2009 | Wagener et al. | 359/385 |
| 2010/0225668 | A1 * | 9/2010 | Tatke et al. | 345/660 |
| 2011/0102723 | A1 * | 5/2011 | Okamoto et al. | 349/141 |

FOREIGN PATENT DOCUMENTS

| | | |
|---|---|---|
| DE | 10 2006 010104 A1 | 8/2007 |
| JP | 06-004213 A | 1/1994 |
| JP | 08-223563 A | 8/1996 |
| JP | 09-319518 A | 12/1997 |
| JP | 10-333053 A | 12/1998 |

(Continued)

OTHER PUBLICATIONS

Extended European Search Report (EESR) dated Feb. 22, 2011 (in English) in counterpart European Application No. 10007099.4.
Partial European Search Report dated Oct. 5, 2010 (in English) issued in counterpart European Application No. 10007099.4.

(Continued)

*Primary Examiner* — Karen Tang
(74) *Attorney, Agent, or Firm* — Holtz, Holtz, Goodman & Chick, P.C.

(57) ABSTRACT

A microscope controller that performs operations for controlling operations of motorized units configuring a microscope system includes a touch panel unit that accepts an input made with an external physical contact and has a display function, a controlling unit for setting a display area as a functional area by assigning an image for operating the motorized unit to a certain display area on the touch panel unit and for generating a control instruction signal for controlling the motorized unit in accordance with a contact operation performed for the motorized unit corresponding to the functional area upon detection of an input made in the functional area, and a communication controlling unit for transmitting the control instruction signal to an external device that controls an operation of the motorized unit.

15 Claims, 42 Drawing Sheets

FOREIGN PATENT DOCUMENTS

| | | |
|---|---|---|
| JP | 2001-059940 A | 3/2001 |
| JP | 2003-281959 | 10/2003 |
| JP | 2008-292578 A | 12/2008 |
| WO | WO 96/18924 A1 | 6/1996 |
| WO | WO 2005/062104 A1 | 7/2005 |

OTHER PUBLICATIONS

Japanese Office Action dated Apr. 23, 2013 (and English translation thereof) in counterpart Japanese Application No. 2009-165981.

* cited by examiner

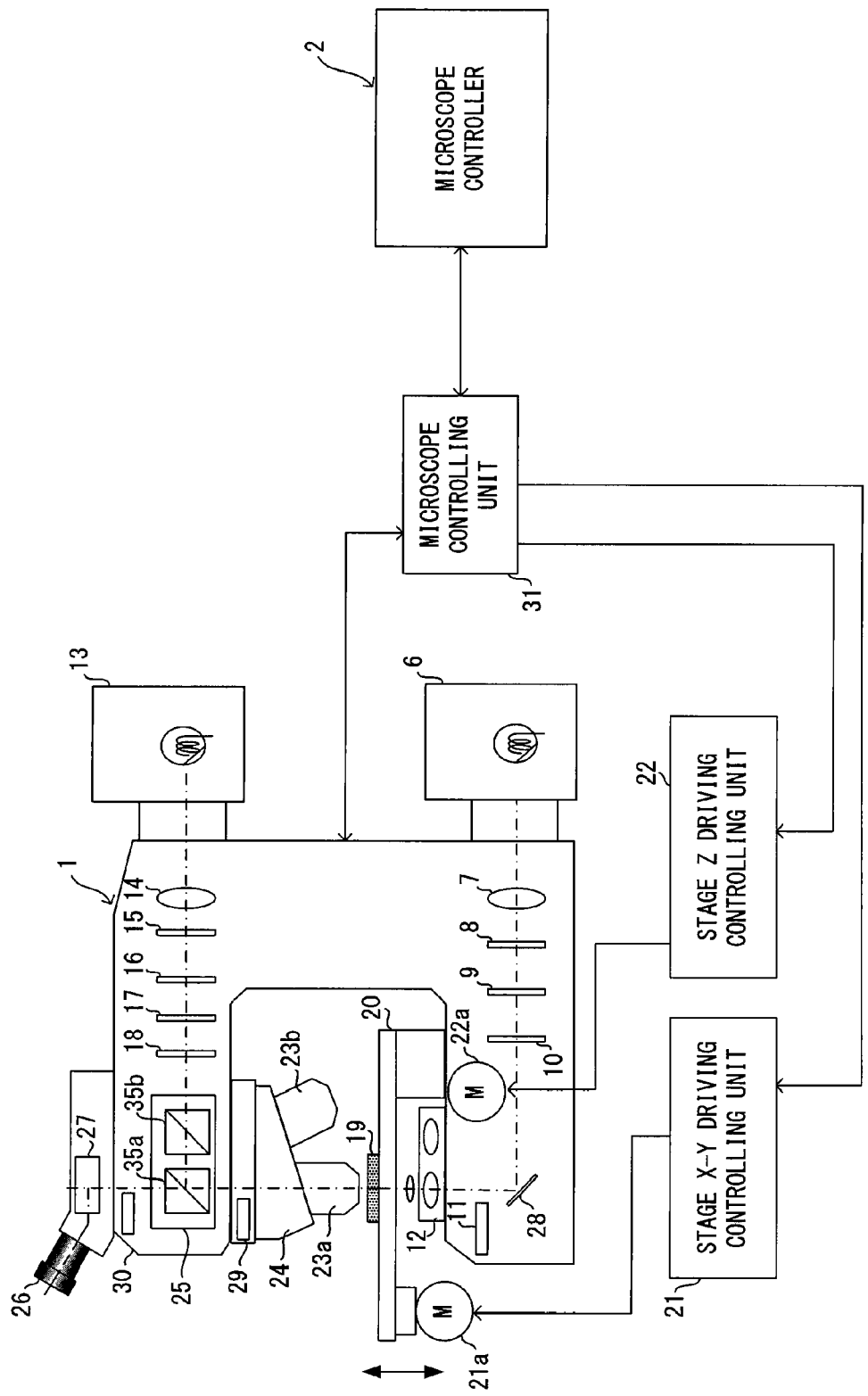
F I G. 1

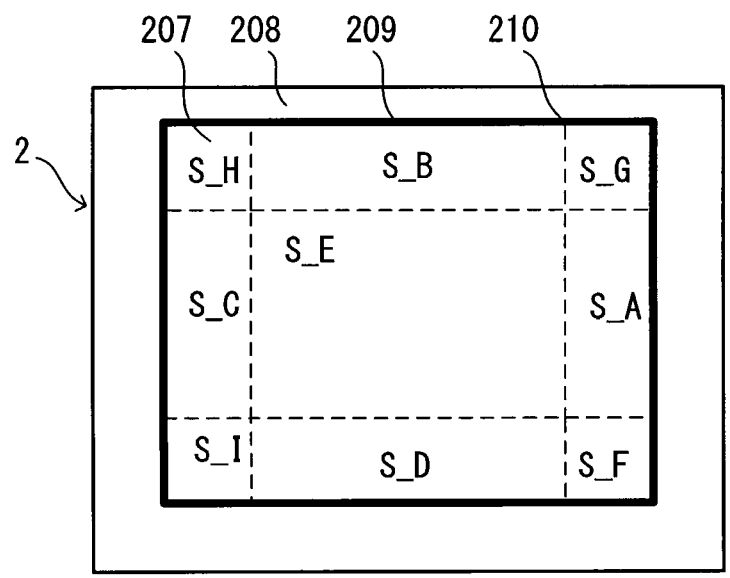
F I G. 4 A
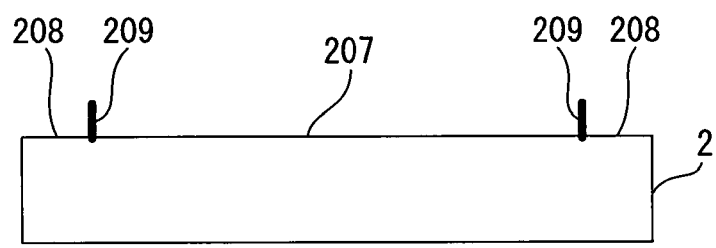
F I G. 4 B

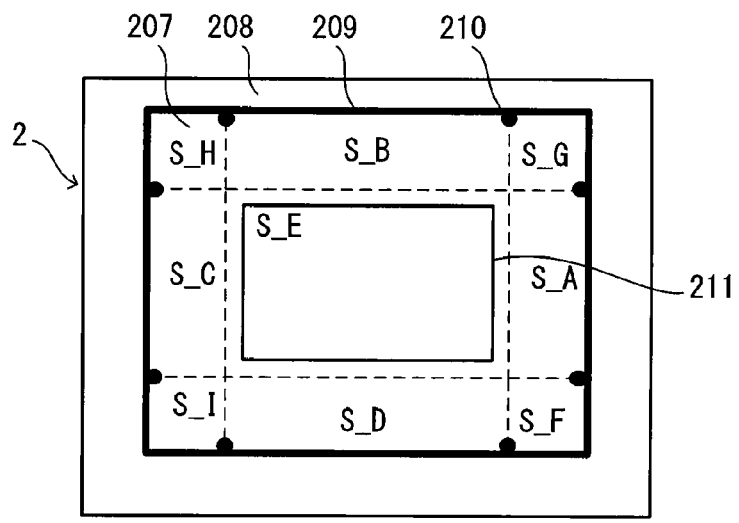
F I G. 5 A
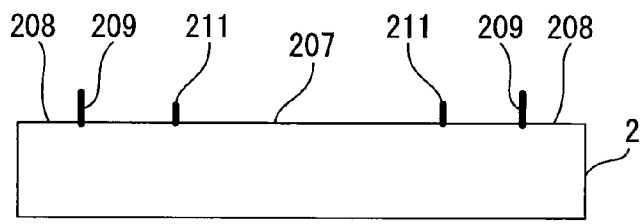
F I G. 5 B
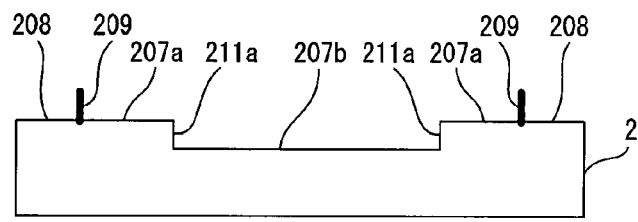
F I G. 5 C
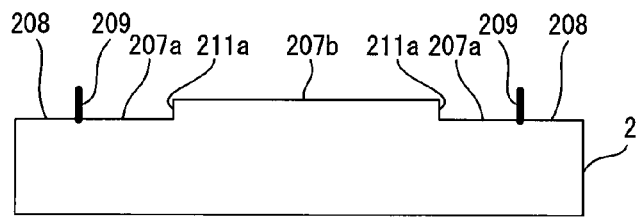
F I G. 5 D

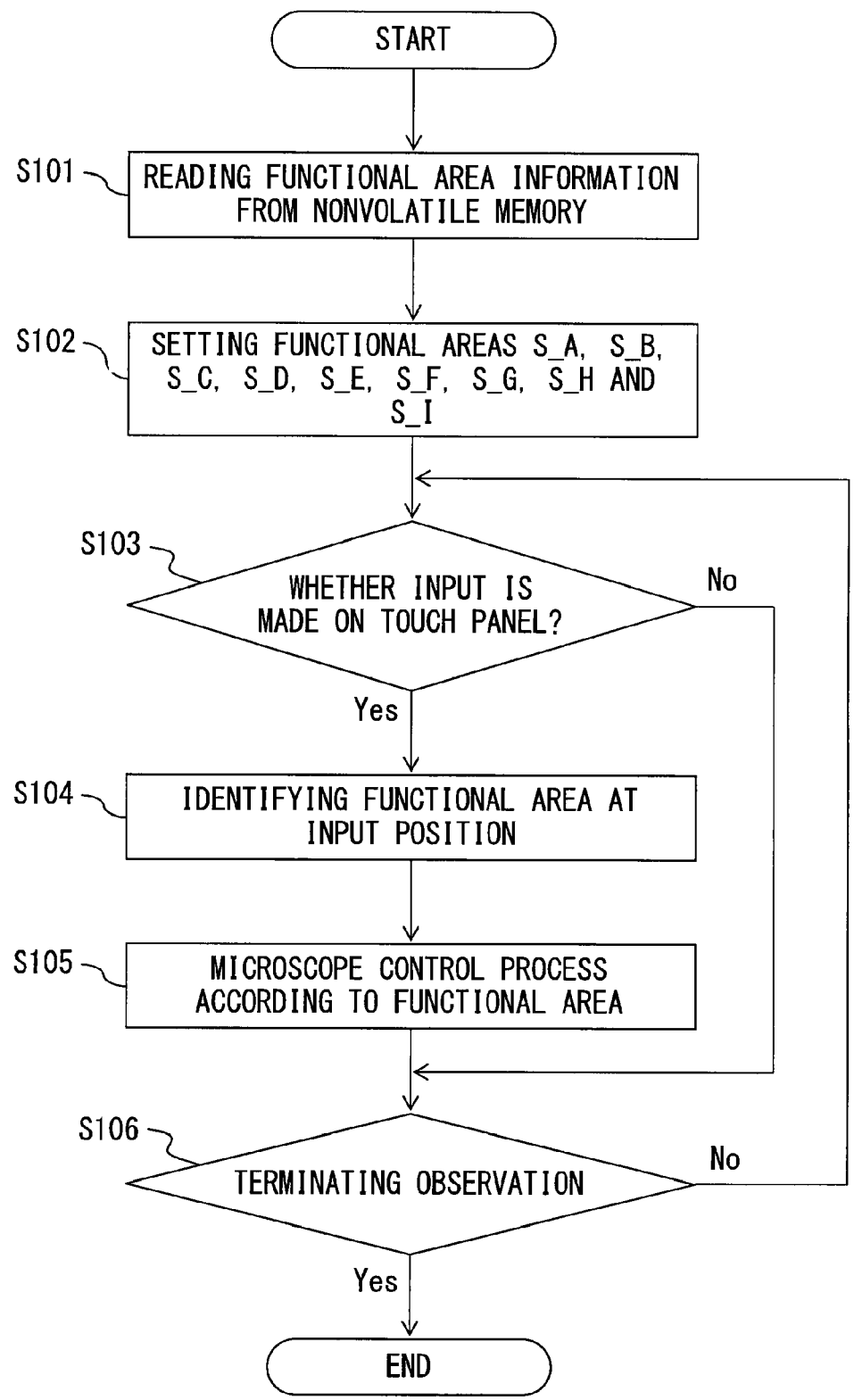
F I G. 7

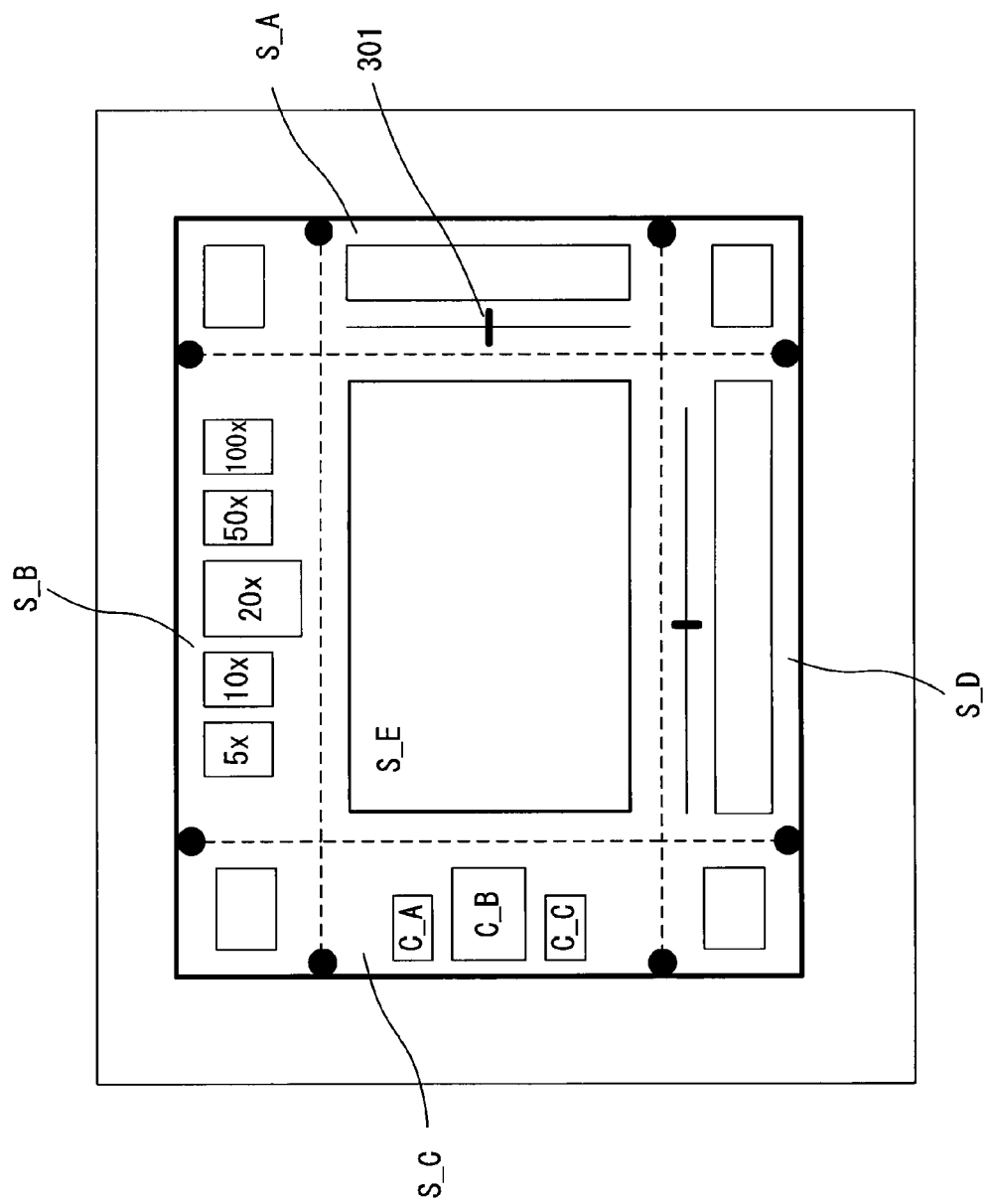

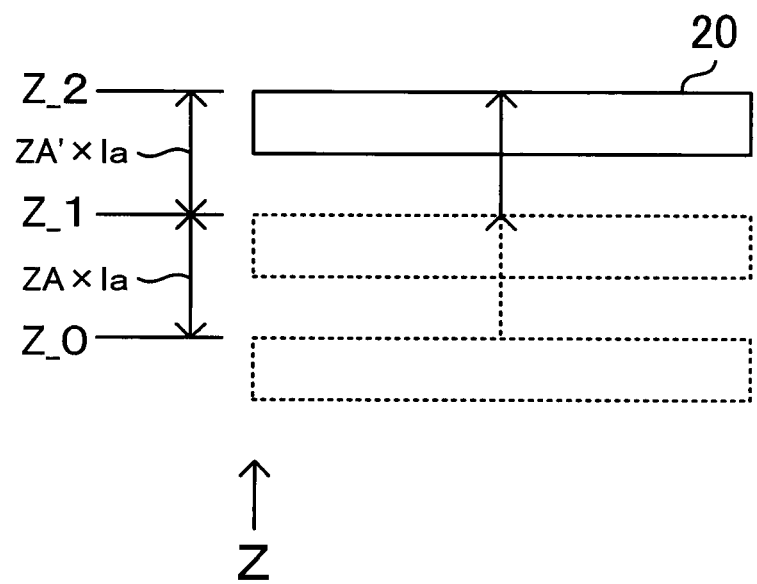
F I G. 1 1 B

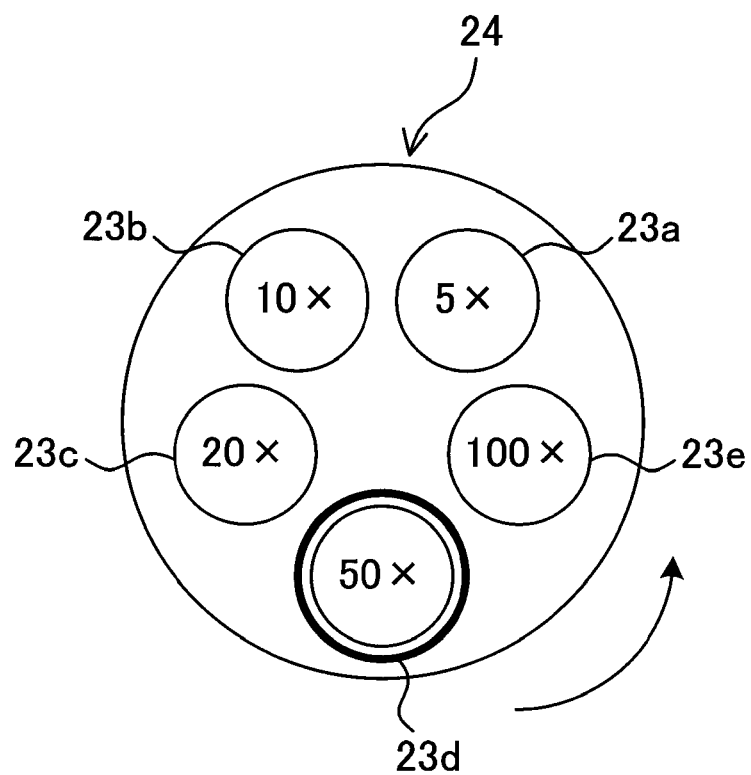
F I G. 17B

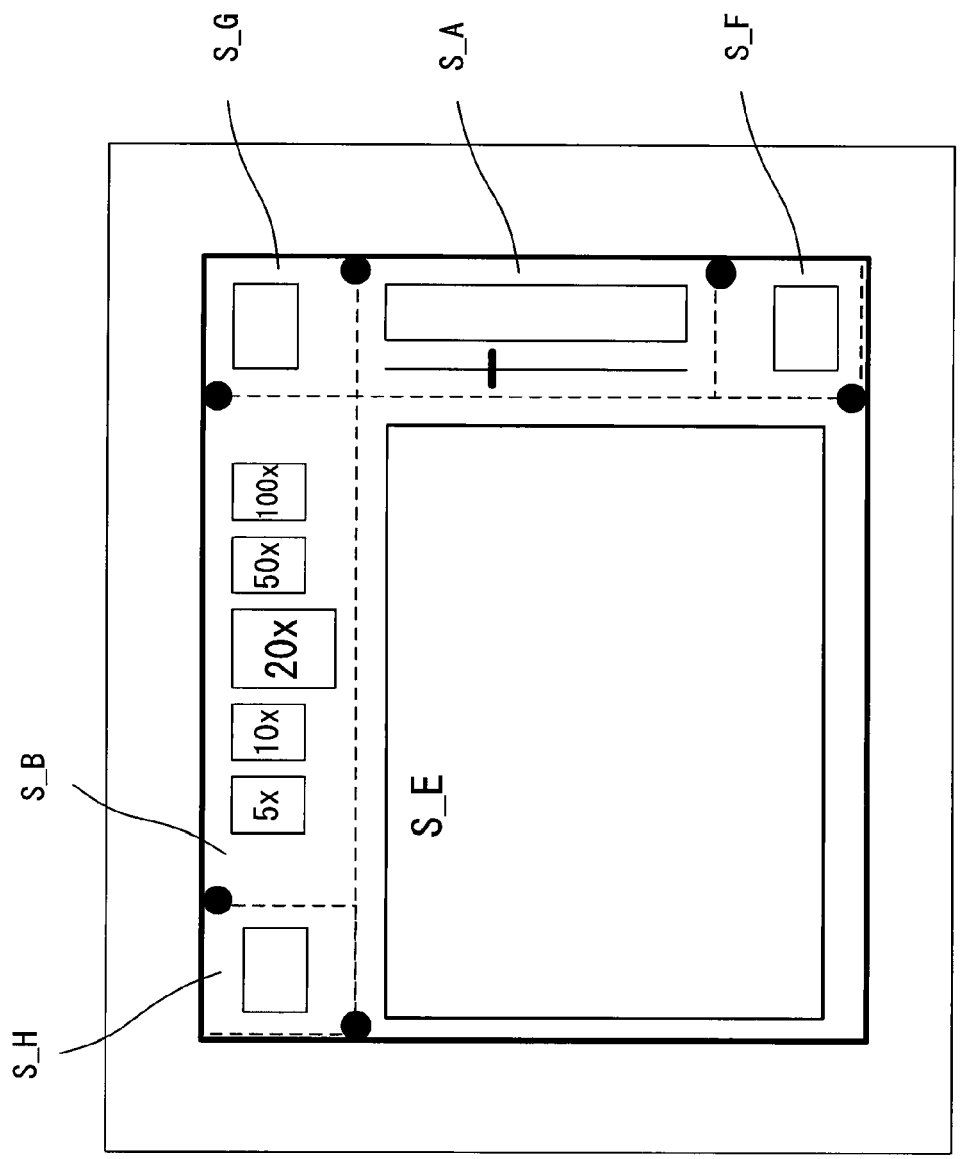

MICROSCOPE SYSTEM THAT IS CAPABLE OF ELECTRICALLY CHANGING AN OBSERVATION STATE OF A SAMPLE

CROSS-REFERENCE TO RELATED APPLICATIONS

This application is based upon and claims the benefit of priority of the prior Japanese Patent Application No. 2009-165981, filed on Jul. 14, 2009, the entire contents of which are incorporated herein by reference.

FIELD

The present invention relates to a microscope system which includes a plurality of objective lenses, enlarges and observes a minute sample, and in which various optical members are respectively electrically-driven by electric driving device such as motors.

BACKGROUND

Microscope apparatuses are widely used in studies, examinations and the like in a biological field in addition to an industrial field. An observation and an examination that are made with such a microscope apparatus are implemented by operating a motorized stage capable of moving a sample to be observed on a plane orthogonal to an observation optical path extending from an objective lens in the microscope apparatus including a plurality of objective lenses normally having different magnifications. When a sample is observed with such a microscope, various types of components (such as various types of illuminations, an aperture stop, a field stop, a revolver, an automatic focusing mechanism, a switching mechanism of optical elements such as a lens, a filter or the like), which configure a microscope, need to be operated according to an observation condition.

As a technique for operating these components, for example, a method for connecting an operation device to a body of a microscope, for driving the components according to an operation performed for the operation device, and for grasping driven states of the components with a display made on the operation device is normally known. Namely, a controller dedicated to a microscope, or a microscope controller such as a PC (Personal Computer) or the like is connected to a body of a microscope via a communication cable. Then, a command is exchanged with the main body of the microscope according to an operation of the microscope controller, so that various types of settings are made by driving controls of the components.

Examples of techniques related to a technique disclosed by this specification include WO96/18924 and Japanese Laid-open Patent Publication No. 2008-292578.

SUMMARY

A microscope controller that performs an operation for controlling an operation of each motorized unit configuring a microscope system according to the present invention includes: a touch panel unit that accepts an input made with an external physical contact, and has a display function; a controlling unit for setting a display area as a functional area by assigning an image for operating the motorized unit to the certain display area of the touch panel unit, and for generating a control instruction signal for controlling the motorized unit in accordance with a contact operation performed for the motorized unit corresponding to the functional area upon detection of an input made in the functional area; and a communication controlling unit for transmitting the control instruction signal to an external device that controls an operation of the motorized unit.

In the microscope controller, the controlling unit successively sets one or more functional areas in a predetermined range along a periphery of the touch panel unit, and generates a control instruction signal according to a drag operation performed in the functional area.

In the microscope controller, the controlling unit assigns, to the one or more functional areas set along the periphery of the touch panel unit, at least any of a function of adjusting a coordinate of a motorized stage in an optical axis direction, a function of adjusting an amount of dimming of a light source unit, a function of adjusting an optical magnification by switching among objective lenses attached to a revolver unit, a function of switching among optical elements included in an optical element turret unit, and a function of adjusting a zoom magnification of a zooming mechanism.

In the microscope controller, the controlling unit sets a functional area as a central functional area in an area enclosed by the functional areas set along the periphery of the touch panel unit, and generates a control instruction signal according to a drag operation performed in the central functional area.

In the microscope controller, the controlling unit generates a control instruction signal for controlling a move of the motorized stage in a direction vertical to the optical axis direction in accordance with a drag operation performed in the central functional area.

The microscope controller further comprises a positional marker part that is a physical marker at a predetermined position on the touch panel unit.

In the microscope controller, the positional marker part is a frame-shaped convex part that has a predetermined height and is provided along the periphery of the touch panel unit, or a level difference formed between a flat surface of the touch panel unit when the touch panel unit is installed at a concave bottom provided on a predetermined surface of a housing of the microscope controller and the predetermined surface of the housing.

In the microscope controller, one or more protrusions are formed on an inner wall side of the frame-shaped convex part, or on a side wall of the level difference.

The microscope controller further comprises first and second positional marker parts that are physical markers at predetermined positions on the touch panel unit. In the microscope, the controlling unit successively sets one or more functional areas in a predetermined range along the periphery of the touch panel unit, and sets a functional area as a central functional area in an area enclosed by the functional areas set along the periphery of the touch panel unit, the first positional marker part is a first frame-shaped convex part that has a predetermined height and is provided along the periphery of the touch panel unit, or a first level difference formed between a flat surface of the touch panel unit when the touch panel unit is installed at a concave bottom provided on a predetermined surface of a housing of the microscope controller and the predetermined surface of the housing, and the second positional marker part is a second frame-shaped convex part that has a predetermined height and is provided, on the touch panel unit, along a border between the central functional area and the functional areas set along the periphery of the touch panel unit, or a second level difference formed between a surface including the central functional area and a surface including the functional areas.

In the microscope controller, one or more protrusions are formed on at least any of an inner wall side of the first frame-shaped convex part or a side wall of the first level difference, and the second frame-shaped convex part or the second level difference.

In the microscope controller, the second frame-shaped convex part is attachable/detachable to/from the touch panel unit. Furthermore, a microscope system includes the microscope controller.

BRIEF DESCRIPTION OF DRAWINGS

FIG. 1 illustrates an example of a configuration of a microscope system according to an embodiment;

FIG. 4A is a top view of a microscope controller (implementation example 3) according to this embodiment;

FIG. 4B is a side view of the microscope controller (implementation example 3) according to this embodiment;

FIG. 5A is a top view of a microscope controller (implementation example 4) according to this embodiment;

FIG. 5B is a side view of the microscope controller (implementation example 4) according to this embodiment;

FIG. 5C is a side view of the microscope controller (modification example 1 of the implementation example 4) according to this embodiment;

FIG. 5D is a side view of the microscope controller (modification example 2 of the implementation example 4) according to this embodiment;

FIG. 7 is a flow of a control of a microscope controller when a touch operation is performed on a functional area to which a function is assigned in this embodiment;

FIG. 8 is an explanatory view of operations of a microscope system when a touch operation is performed on functional areas to which functions of operating a motorized unit configuring a microscope are respectively assigned in this embodiment;

FIG. 11B is an explanatory view (No. 3) of a move of the stage in the Z direction as a result of the operation;

FIG. 17B is an explanatory view (No. 4) of positions of the objective lenses arranged on the motorized revolver 24 as a result of the operation;

FIG. 26A illustrates an example (No. 1) where the functional area S_E having an operational function of moving the stage in the X-Y direction, the functional area S_A having an operational function of moving the stage in the Z direction, and the functional area S_B having an operational function of switching among objective lenses are arranged in a periphery of a touch panel.

DESCRIPTION OF EMBODIMENTS

Figure 2A:
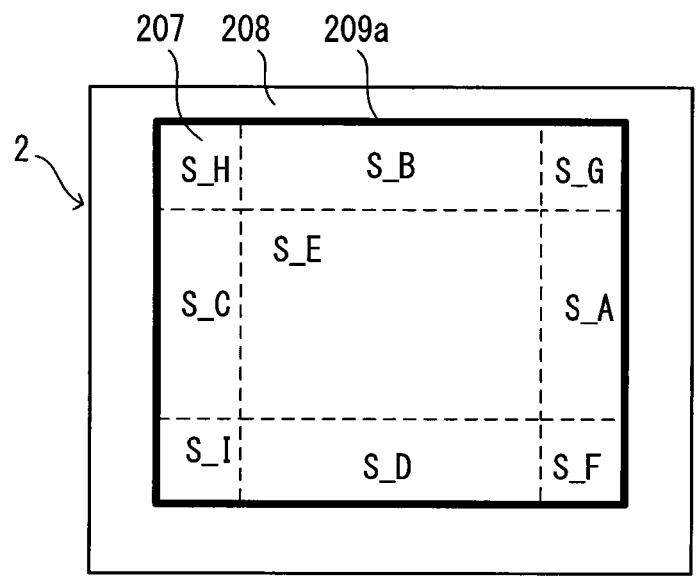
FIG. 2A is a top view of a microscope controller (implementation example 1) according to this embodiment.

In recent years, microscope controllers having a touch panel function to support various operations have been marketed. Namely, microscope controllers are used to operate a microscope by arranging arbitrary button areas on a touch panel, and by pressing the button areas.

For such touch panel controllers, however, an operational screen is configured by arranging contents equivalent to a PC operational screen unchanged. Especially, blind touch operations are not taken into account. Therefore, when an observer operates a button, he or she needs to verify the position of the button by once looking away from an eyepiece lens. This deteriorates microscope operability.

In consideration of the above described problem, an embodiment of the present invention provides a microscope controller that can improve the microscope operability of a user, and also provides a microscope system including the microscope controller.

The microscope controller that performs operations for controlling operations of motorized units configuring a microscope system according to an embodiment of the present invention includes a touch panel unit, a controlling unit, and a communication controlling unit.

The touch panel unit accepts an input externally made with a physical contact, and has a display function. The touch panel unit corresponds to, for example, a touch panel unit 207 in this embodiment.

The controlling unit sets a certain display area as a functional area by assigning an image for operating a motorized unit to the display area of the touch panel unit. In addition, the controlling unit generates a control instruction signal for controlling the motorized unit in accordance with a contact operation performed for the motorized unit corresponding to the functional area upon detection of an input made to the functional area. The controlling unit corresponds to, for example, a CPU 201 in this embodiment.

The communication controlling unit transmits the control instruction signal to an external device that controls the operations of the motorized unit. The communication controlling unit corresponds to, for example, a communication controlling unit 205 in this embodiment.

With this configuration, the microscope operability of a user can be improved.

The controlling unit can successively set one or more functional areas in a predetermined range along a periphery of the touch panel unit, and can generate a control instruction signal according to a drag operation performed in the functional areas.

With this configuration, the position of a functional area set on the touch panel can be accurately grasped when a finger is moved along the periphery of the touch panel unit.

The controlling unit may assign, to the functional areas set along the periphery of the touch panel unit, at least any of a function of adjusting a coordinate of the motorized stage in an optical axis direction, a function of adjusting the amount of dimming of a light source unit, a function of adjusting an optical magnification by switching among objective lenses attached to a revolver unit, a function of switching among optical elements included in an optical element turret unit, and a function of adjusting a zoom magnification of a zooming mechanism.

With this configuration, various types of operations of the microscope can be implemented by performing a drag operation along the periphery without looking away from the eyepiece lens 26.

Additionally, the controlling unit sets a functional area as a central functional area (for example, an area denoted with S_E in this embodiment) in an area enclosed by the functional areas set along the periphery of the touch panel unit, and generates a control instruction signal according to a drag operation performed in the central functional area. Specifically, the controlling unit generates a control instruction signal for controlling a move of the motorized stage in a direction vertical to an optical axis direction of the motorized stage in accordance with a drag operation performed in the central functional area.

With this configuration, the motorized stage can be moved on an X-Y plane.

The microscope controller further includes a positional marker part that is a physical marker at a predetermined position on the touch panel. The positional marker part is a frame-shaped convex part (for example, a restriction frame 209 in this embodiment) that has a predetermined height and is provided along the periphery of the touch panel unit, or a level difference (for example, a level difference 209a in this embodiment) formed between a flat surface of the touch panel unit when the touch panel unit is installed at a concave bottom provided on a predetermined surface of a housing of the microscope controller and a predetermined surface of the housing.

With this configuration, the position of a functional area set on the touch panel can be accurately grasped when a finger is moved along the restriction frame or the level difference.

Note that one or more protrusions may be formed on an inner wall side of the frame-shaped convex part, or on a side wall of the level difference. With this configuration, the position of a functional area set on the touch panel can be more accurately grasped.

Additionally, the microscope controller may include first and second positional marker parts that are physical markers at predetermined positions of the touch panel unit. In this case, the controlling unit successively sets one or more functional areas in a predetermined range along the periphery of the touch panel unit. At the same time, the controlling unit sets a functional area as a central functional area in an area enclosed by the functional areas set along the periphery of the touch panel unit. At this time, the first positional marker part is a first frame-shaped convex part (for example, the restriction frame 209 in this embodiment) that has a predetermined height and is provided along the periphery of the touch panel unit, or a first level difference (for example, the level difference 209a in this embodiment) formed between a flat surface of the touch panel unit when the touch panel unit is installed at a concave bottom provided on a predetermined surface of a housing of the microscope controller and a predetermined surface of the housing. The second positional marker part is a second frame-shaped convex part (for example, a protruding frame 209 in this embodiment) that has a predetermined height and is provided along a boundary between the central functional area on the touch panel unit and the functional areas set along the periphery of the touch panel unit, or a second level difference (for example, a level difference 211a in this embodiment) formed between a surface including the central functional area and a surface including the functional areas.

With this configuration, the position of a functional area set on the touch panel can be accurately grasped when a finger is moved along the restriction frame, the protruding frame, or the level difference.

Additionally, one or more protrusions may be formed on at least any of an inner wall side of the first frame-shaped convex part or a side wall of the first level difference, and the second frame-shaped convex part or the second level difference. With this configuration, the position of a functional area set on the touch panel can be more accurately grasped.

Furthermore, the second frame-shaped convex part may be detachable from the touch panel unit. With this configuration, the protruding frame can be detached when necessary. Moreover, a microscope system may include the microscope controller.

FIG. 1 illustrates an example of a configuration of the microscope system according to this embodiment. A microscope apparatus 1 includes, as a transmission observation optical system, a transmission illumination light source 6, a collector lens 7 for collecting illumination light of the transmission illumination light source 6, a transmission filter unit 8, a transmission field stop 9, a transmission aperture stop 10, a condenser optical element unit 11, and a top lens unit 12.

Additionally, the microscope apparatus 1 includes, as an epi-observation optical system, an epi-illumination light source 13, a collector lens 14, an epi filter unit 15, an epi shutter 16, an epi field stop 17, and an epi aperture stop 18.

Furthermore, a motorized stage 20 on which a sample 19 is put is provided in an observation optical path where an optical path of the transmission observation optical system and that of the epi observation optical path overlap. The motorized stage 20 can be moved in an upward/downward (Z) direction, and in right and left (X-Y) directions.

A move of the motorized stage 20 is controlled by a stage X-Y driving controlling unit 21 and a stage Z driving controlling unit 22. The stage X-Y driving controlling unit 21 moves the stage 20 in the X and the Y directions by controlling driving of an X-Y motor 21a. The stage Z driving controlling unit 22 moves the stage 20 in the Z direction by controlling driving of a Z motor 22a.

The motorized stage 20 has a function (not illustrated) of detecting an origin with an origin sensor. Therefore, coordinates of the sample 19 put on the motorized stage 20 can be detected, and the move of the motorized stage 20 can be controlled with a coordinate specification.

Additionally, a revolver 24, a cube turret 25, and a beam splitter 27 are provided in the observation optical path.

The revolver 24 is provided with a plurality of objective lenses 23a, 23b, . . . (collectively referred to as objective lenses 23 hereinafter if necessary). By rotating the revolver 24, any of the plurality of objective lenses 23 can be selected and used for an observation.

A fluorescence cube A (35a), a fluorescence cube B (35b), and a fluorescence cube C (not illustrated) respectively have an excitation filter, a dichroic mirror, and an absorption filter corresponding to each fluorescent observation wavelength. With the cube turret 25, switching can be made to any of the fluorescence cubes A (35a), B (35b), C (not illustrated), . . . , and the switched fluorescence cube can be arranged in the optical path.

The observation optical path is branched by the beam splitter 27 to the side of the eyepiece lens 26 and the side of a video camera (not illustrated).

Furthermore, a polarizer 28 for a differential interference observation, a DIC (Differential Interference Contrast) prism 29, and an analyzer 30 can be inserted in the observation optical path.

These units are motorized, and operations thereof are controlled by a microscope controlling unit 31 described below.

The microscope controlling unit 31 is connected to the microscope controller 2. The microscope controlling unit 31 has a function of controlling operations of the entire microscope apparatus 1. The microscope controlling unit 31 changes a microscopy, and dims the transmission illumination light source 6 and the epi-illumination light source 13 in accordance with a control signal or a command from the microscope controller 2. Moreover, the microscope controlling unit 31 has a function of transmitting the current state of the microscopy made by the microscope apparatus 1 to the microscope controller 2. The microscope controlling unit 31 is connected also to the stage X-Y driving controlling unit 21, and the stage Z driving controlling unit 22. Accordingly, the motorized stage 20 can be controlled by the microscope controller 2 via the microscope controlling unit 31.

FIGS. 2 to 5 illustrate variations of the microscope controller according to this embodiment. The microscope controller 2 is a controller having a touch panel 207 on which a user actually makes an input for an operation of the microscope 1.

To a certain area on the touch panel 207, a predetermined attribute for operating the microscope system 1 is assigned. A user can perform various types of operations of the microscope by operating functional areas (GUI (Graphical User Interface) buttons or the like displayed on the touch panel) to which predetermined attributes are respectively assigned. The microscope controllers illustrated in FIGS. 2 to 5 are respectively described below.

Figure 2B:
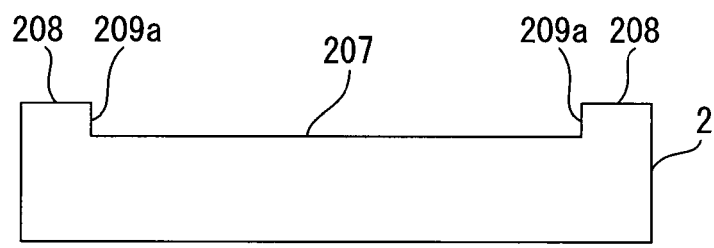
FIG. 2B is a side view of the microscope controller (implementation example 1) according to this embodiment.

FIG. 2A is a top view of a microscope controller 2 (implementation example 1) according to this embodiment. FIG. 2B is a side view of the microscope controller 2 (implementation example 1) according to this embodiment. The touch panel 207 functions both as a display device and an input device. The touch panel 207 is fit into an outer housing 208 of the microscope controller 2 as illustrated in FIG. 2A.

The touch panel 207 is installed at a concave bottom of the outer housing 208. A level difference 209a is provided between a surface of the touch panel 207 and an outer surface of the outer housing 208.

Here, functions can be respectively assigned to areas (functional areas) denoted with S_A, S_B, S_C and S_D on the touch panel 207. As a result, the level difference 209a serves as a guide when a finger is moved along the level difference 209a. Accordingly, the positions of the functional areas denoted with S_A, S_B, S_C and S_D can be grasped along the level difference 209a.

Additionally, areas denoted with S_F, S_G, S_H and S_I are functional areas arranged at corners of the touch panel 207. Moreover, a functional area S_E is arranged in a range enclosed by S_A, S_B, S_C and S_D.

Figure 3A:
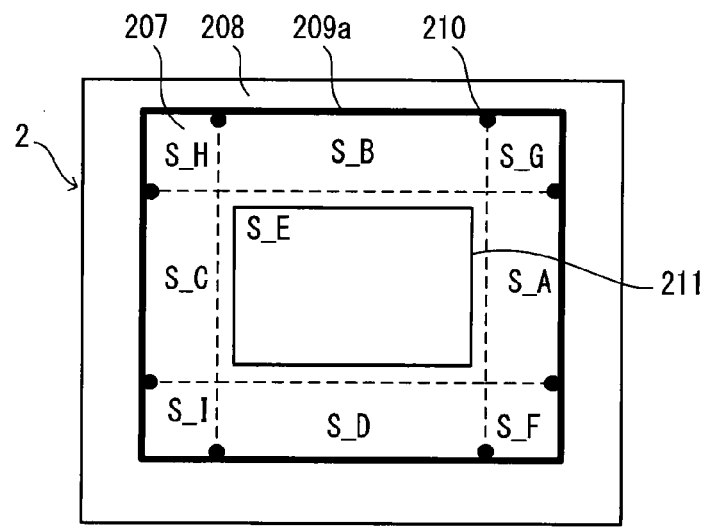
FIG. 3A is a top view of a microscope controller (implementation example 2) according to this embodiment.
Figure 3B:
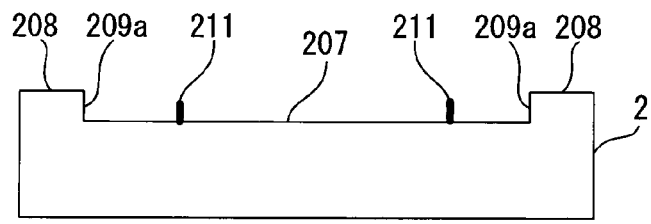
FIG. 3B is a side view of the microscope controller (implementation example 2) according to this embodiment.

FIG. 3A is a top view of a microscope controller 2 (implementation example 2) according to this embodiment. FIG. 3B is a side view of the microscope controller 2 (implementation example 2) according to this embodiment. The microscope controller 2 illustrated in FIGS. 3A and 3B is configured by providing one or more protrusions 210 on the restriction frame 209 illustrated in FIGS. 2A and 2B, and by providing a protruding frame 211.

The protrusions 210 are of size that a user can recognize when the user moves the touch panel 207 with his or her finger along the level difference 209a. Therefore, the level difference 209a and the protrusions 210 serve as a guide when the finger is moved along the level difference 209a. Accordingly, compared with the case illustrated in FIGS. 2A and 2B, the positions of the functional areas denoted with S_A, S_B, S_C and S_D can be more accurately grasped along the level difference 209a based on the positions of the protrusions 210.

Additionally, with the protrusions 210 and the corners of the touch panel 207, the positions of the functional areas that are denoted with S_F, S_G, S_H and S_I and enclosed by the protrusions 210 and the corners can be more clearly grasped.

Furthermore, the protruding frame 211 that is provided on the touch panel separates the functional area S_E from the other functional areas. Therefore, the protruding frame 211 serves as a guide. Accordingly, compared with the case illustrated in FIGS. 2A and 2B, the position of the functional area enclosed by the protruding frame 211 can be made clearer, and the position of the functional area S_E can be more accurately grasped.

Figure 3C:
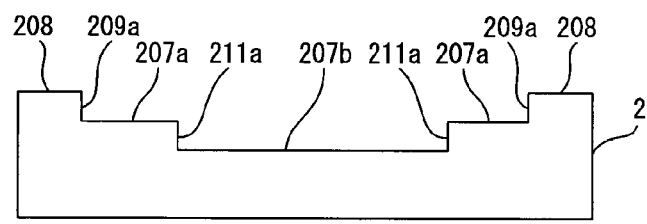
FIG. 3C is a side view of the microscope controller (modification example 1 of the implementation example 2) according to this embodiment.
Figure 3D:
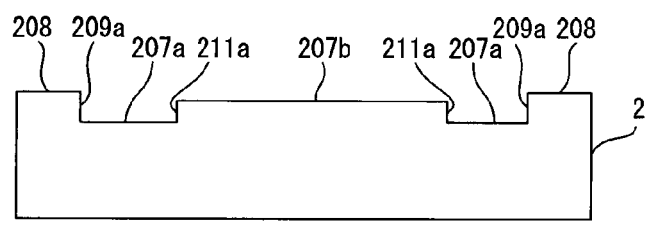
FIG. 3D is a side view of the microscope controller (modification example 2 of the implementation example 2) according to this embodiment.

As illustrated in FIGS. 3C and 3D, the area 207b denoted with S_E may be provided at a position lower or higher than the areas 207a composed of S_A, S_B, S_C, S_D, S_F, S_G, S_H and S_I, and a resultant level difference 211a may be used as the protruding frame 211.

FIG. 4A is a top view of a microscope controller 2 (implementation example 3) according to this embodiment. FIG. 4B is a side view of the microscope controller 2 (implementation example 3) according to this embodiment. In FIGS. 2A, 2B, 3A and 3B, the touch panel 207 is installed at the concave bottom of the outer housing 208. In the meantime, in FIG. 4B, there is no level difference between the surface of the touch panel 207 and that of the outer housing 208, and only the restriction frame 209 that has a predetermined height and is provided at a boundary between the touch panel 207 and the outer housing 208 is provided. The restriction frame 209 is provided along the outline of the touch panel. Also with this configuration, effects similar to those of FIGS. 2A and 2B can be achieved.

FIG. 5A is a top view of a microscope controller 2 (implementation example 4) according to this embodiment. FIG. 5B is a side view of the microscope controller 2 (implementation example 4) according to this embodiment. The microscope controller 2 illustrated in FIGS. 5A and 5B is configured by providing one or more protrusions 210 on the restriction frame 209 illustrated in FIGS. 4A and 4B, and by providing the protruding frame 211.

Since the functions of the protrusions 210 and the protruding frame 11 are similar to those described in FIGS. 3A and 3B, their explanations are omitted. In FIGS. 3A and 5A, only the restriction frame 209 and the protruding frame 211 may be provided without arranging the protrusions 210. Alternatively, the protrusions 210 may be provided on the restriction frame 209 in FIGS. 2A and 4A.

As illustrated in FIGS. 5C and 5D, the area 207b denoted with S_E may be provided at a position lower or higher than the areas 207a composed of S_A, S_B, S_C, S_D, S_F, S_G, S_H, and S_I, and a resultant level difference 211a may be used as the protruding frame 211.

Figure 6:
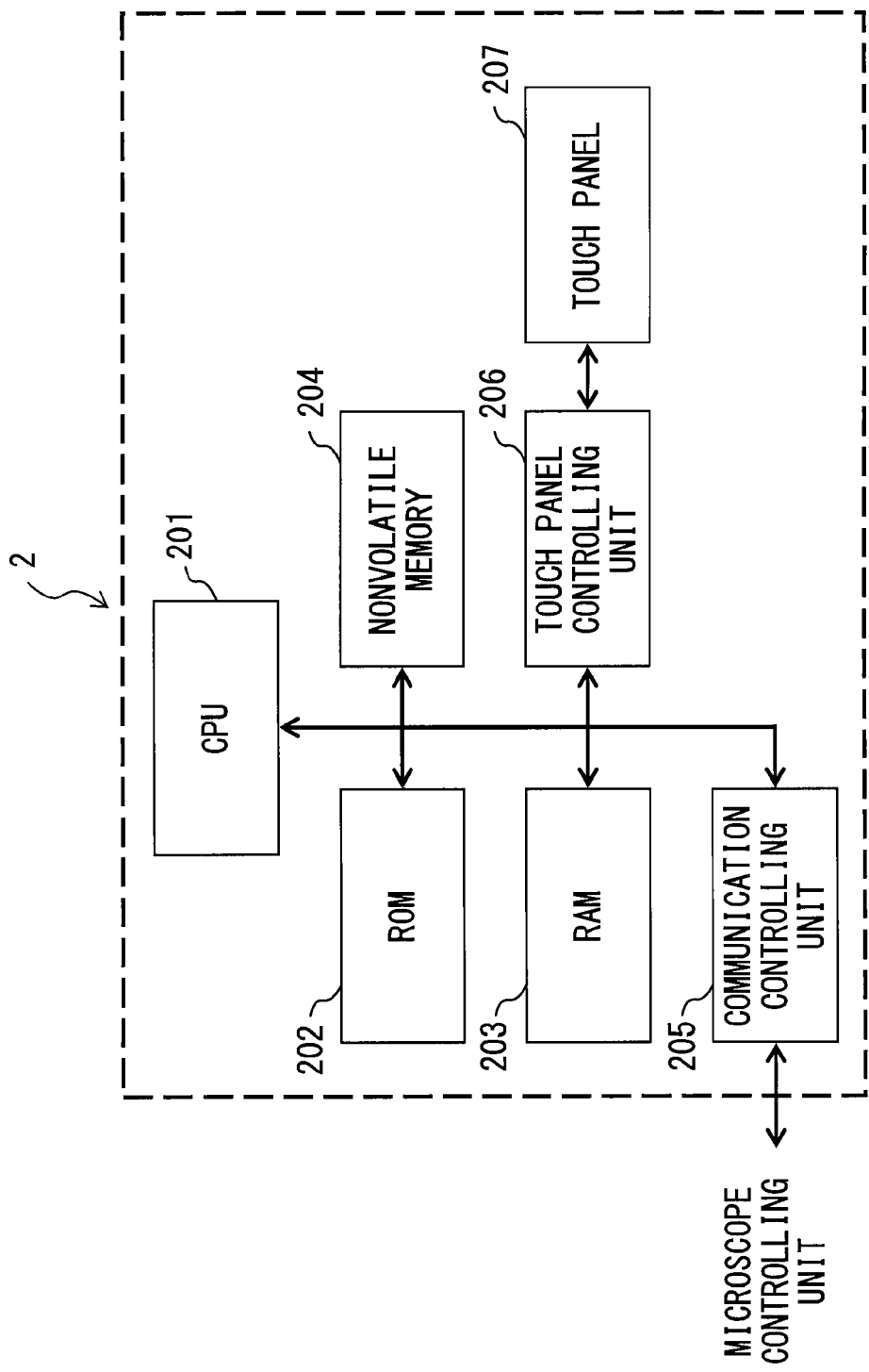
FIG. 6 illustrates an overview of an internal configuration of the microscope controller according to this embodiment.

FIG. 6 illustrates an overview of an internal configuration of the microscope controller 2 according to this embodiment. The microscope controller 2 includes a CPU (Central Processing Unit) 201, a RAM (Random Access Memory) 202, a ROM (Read Only Memory) 203, a nonvolatile memory 204, a communication controlling unit 205, a touch panel controlling unit 206, and a touch panel 207. Various types of data can be mutually exchanged among these components via a bus under the control of the CPU 201.

The CPU 201 controls the operations of the entire microscope controller 2. The RAM 202 is a memory used by the CPU 201 as a working storage area when the CPU 201 executes a control program, and is a memory used to temporarily store various types of data. The ROM 203 prestores a control program that the CPU 201 executes to control the operations of the microscope controller 2. Note that also application software for controlling the microscope apparatus 1 is part of the control program.

The nonvolatile memory 204 prestores information about a plurality of functional areas (functional area setting information), including an operational button display (icon button display or the like), to which predetermined attributes for operating the microscope 1 are respectively assigned. Specifically, the functional area setting information is information that makes an association between coordinate information on the touch panel, which indicates a range of a functional area, and information about a function assigned to the functional area in order to operate a certain motorized unit configuring the microscope system. For example, for an operation of the stage 20, the function assigned to the functional area in order to operate a motorized unit is a function of moving the stage 20 in an X-Y direction, or a function of moving the stage 20 in a Z direction. Moreover, for an operation of the motorized revolver 24, the function assigned to the functional area in order to operate a motorized unit is a function of selecting an arbitrary objective lens by rotating the motorized revolver and of inserting the selected lens in the observation optical path.

The communication controlling unit 205 manages a data communication (such as a serial communication) with the microscope controlling unit 31 of the main body of the microscope apparatus 1, and transmits control information for controlling the operations of the components and other information to the microscope controlling unit 31.

The touch panel 207 may be of any touch panel types such as a film resistor type, a capacitance type, an infrared ray type, an ultrasound type, or the like, and the type of the touch panel 207 is not limited. Moreover, the touch panel controlling unit 206 detects X and Y coordinates of a position input by a user on the touch panel 207, and transmits the detected coordinate information to the CPU 201.

FIG. 7 is a control flow of the microscope controller 2 when a touch operation is performed on a functional area to which a function is assigned in this embodiment. The CPU 201 that is a controlling unit of the microscope controller 2 reads an application program stored in the ROM 202, and executes the following process.

Initially, the CPU 201 reads functional area setting information recorded in the nonvolatile memory 204 into the RAM 203 (S101). The CPU 201 sets functional areas by respectively assigning attributes for operating the microscope system 1 to the functional areas (including GUI buttons, etc. displayed on the touch panel) on the touch panel 207 on the basis of the functional area setting information (S102).

For example, a functional area represented with coordinates (x1,y1) to (x2,y2) on the touch panel is represented as S_A. A functional area represented with coordinates (x3,y3) to (x4,y4) is represented as S_B. A functional area represented with coordinates (x5,y5) to (x6,y6) is represented as S_C. A functional area represented with coordinates (x7, y7) to (x8, y8) is represented as S_D. A functional area represented with coordinates (x9,y9) to (x10,y10) is represented as S_E. A functional area represented with coordinates (x11, y11) to (x12,y12) is represented as S_F. A functional area represented with coordinates (x13,y13) to (x14,y14) is represented as S_G. A functional area represented with coordinates (x15,y15) to (x16,y16) is represented as S_H. A functional area represented with coordinates (x17,y17) to (x18, y18) is represented as S_I. In this case, the functional area setting information is configured by making an association between each of the functional areas represented with the above coordinates and information about a function assigned to the corresponding functional area.

For example, as illustrated in FIG. 8, the CPU 201 assigns a function of operating the stage 20 of the microscope 1 in the Z direction to the functional area S_A on the basis of the functional area setting information. The CPU 201 assigns a function of operating the motorized revolver 24 that switches among the objective lenses 24 to the functional area S_B on the basis of the functional area setting information. The CPU 201 assigns a function of operating the turret 25 that switches among the cubes 35 to the functional area S_C on the basis of the functional area setting information. The CPU 201 assigns a function of dimming a light source to the functional area S_D on the basis of the functional area setting information. The CPU 201 assigns a function of operating the stage 20 in the X-Y direction to the functional area S_E on the basis of the functional area setting information.

When an input is made on the touch panel 207, the touch panel controlling unit 206 detects X and Y coordinates of the position of the input on the touch panel 207 ("YES" in S103). The touch panel controlling unit 206 then transmits the detected coordinate information to the CPU 201.

The CPU 201 determines, on the basis of the functional area setting information, to which functional area the coordinate information transmitted from the touch panel controlling unit 206 belongs, namely, to which function area the input is made (S104).

The CPU 201 executes a control process according to the corresponding functional area on the basis of a determination result (S105). For example, if the input is made to an arbitrary position in a certain functional area, the CPU 201 controls a display form of an image on a GUI according to coordinate information based on the touch operation. For example, the CPU 201 moves a corresponding image to the position of the input, changes the size of the image, changes a color of the image, changes a shape of the image, or moves a cursor.

Additionally, the CPU 201 calculates an amount of a move on the touch panel according to the coordinate information based on the touch operation. Then, the CPU 201 converts the amount of a move into an amount of driving of the motorized unit assigned to the functional area, and transmits a control instruction signal to the microscope controlling unit 31. Moreover, the CPU 201 transmits content selected on the touch panel according to the coordinate information based on the touch operation to the microscope controlling unit 31 as a control instruction signal. The CPU 201 repeats the processes in S103 to S105 until an observation is terminated (S106).

A control that the CPU 201 performs for the processes in S103 to S105 of the flow illustrated in FIG. 7 according to an operation on the touch panel 207 is described in detail below. For the sake of convenience of explanation, the following explanation is provided by taking the above described implementation example 4 (FIGS. 5A and 5B). However, the control of the CPU 201 is not limited to this one, and may be performed for the other implementation examples.

An operation of the stage 20 in the Z direction is initially described with reference to FIGS. 8 to 13. In FIG. 8, a bar 301 represents a position of a coordinate in the Z direction. As a slider of the bar 301 rises toward the top in FIG. 9A, the stage 20 gets closer to the objective lens 23. As the slider falls in FIG. 9A, the stage 20 draws apart from the objective lens 23.

Figure 9A:
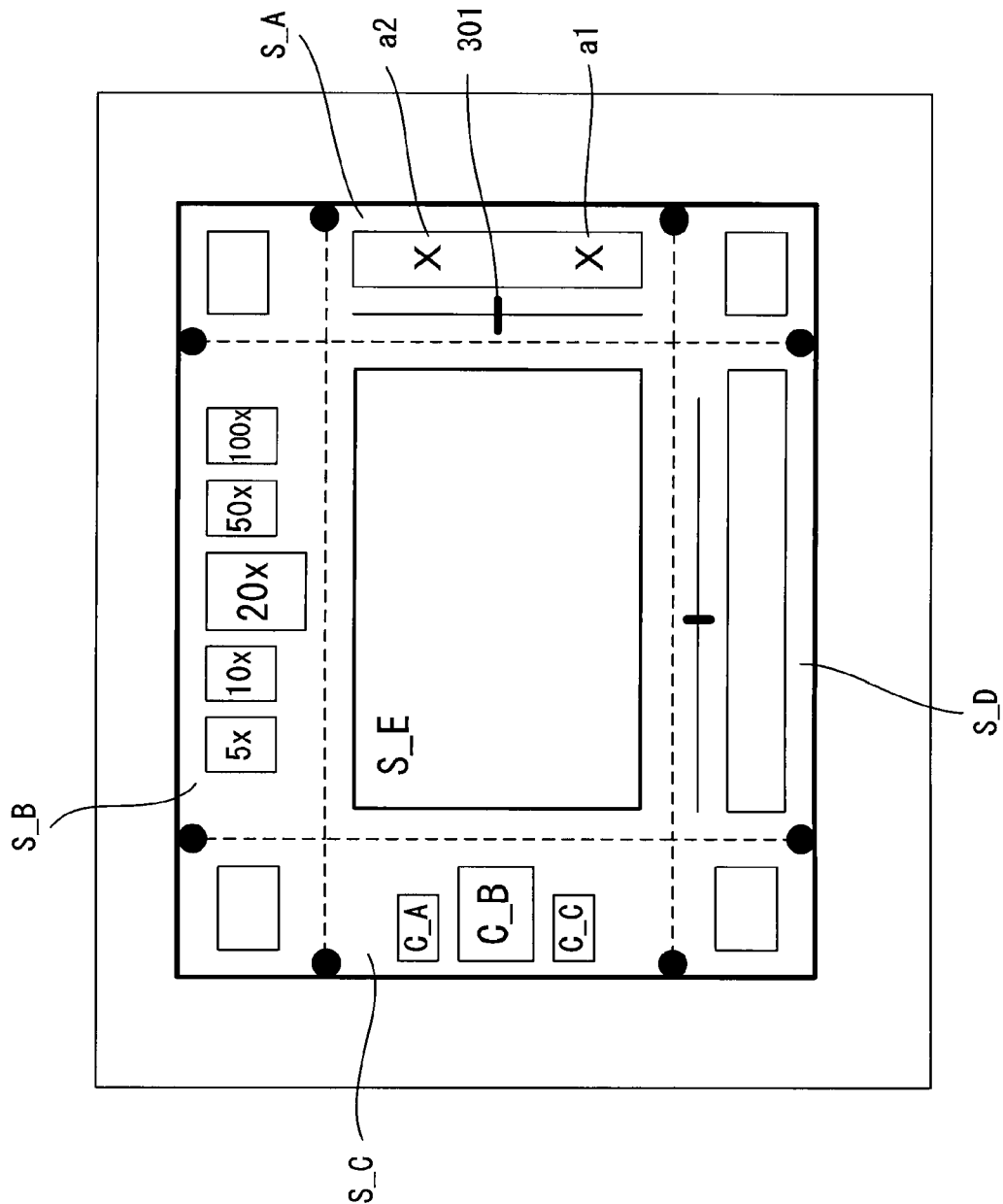
FIG. 9A is an explanatory view (No. 1) of an operation for a functional area S_A to which a function of moving a stage in a Z direction is assigned.
Figure 9B:
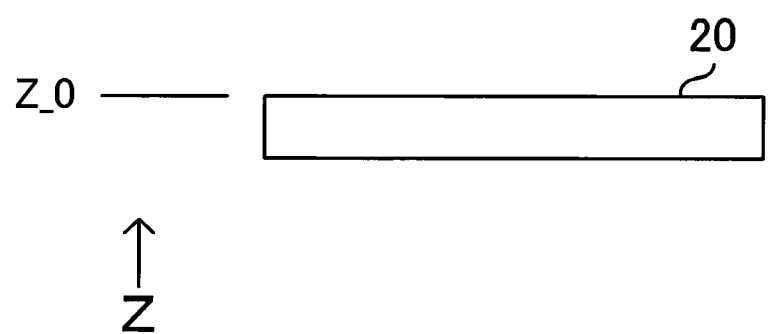
FIG. 9B is an explanatory view (No. 1) of a move of the stage in the Z direction as a result of the operation.

In FIG. 9A, a user touches a point a1 in the functional area S_A, and performs a drag operation (an operation for moving a finger up to a point a2 while touching the touch panel with the finger) up to the point a2 along the restriction frame 209. Then, the microscope controller 2 instructs the stage Z driving controlling unit 22 via the microscope controlling unit 22 so that the stage gets closer to the objective lens 23. As a result, the stage 20 moves upward in FIG. 9B.

Alternatively, in FIG. 9A, the user touches the point a2 in the functional area S_A, and performs a drag operation up to the point a1 along the restriction frame 209. As a result, the microscope controller 2 instructs the stage Z driving controlling unit 22 via the microscope controlling unit 31 so that the stage 20 draws apart from the objective lens 23. As a result, the stage 20 moves downward in FIG. 9B.

As described above, the moving distance of the stage 20 in the Z direction corresponds to the distance of the drag operation performed in the functional area S_A on the touch panel 207. Accordingly, the microscope controller 2 instructs the microscope controlling unit 31 to move the stage 20 by a distance obtained by multiplying the distance dragged on the touch panel by a coefficient $1a$.

Figure 10A:
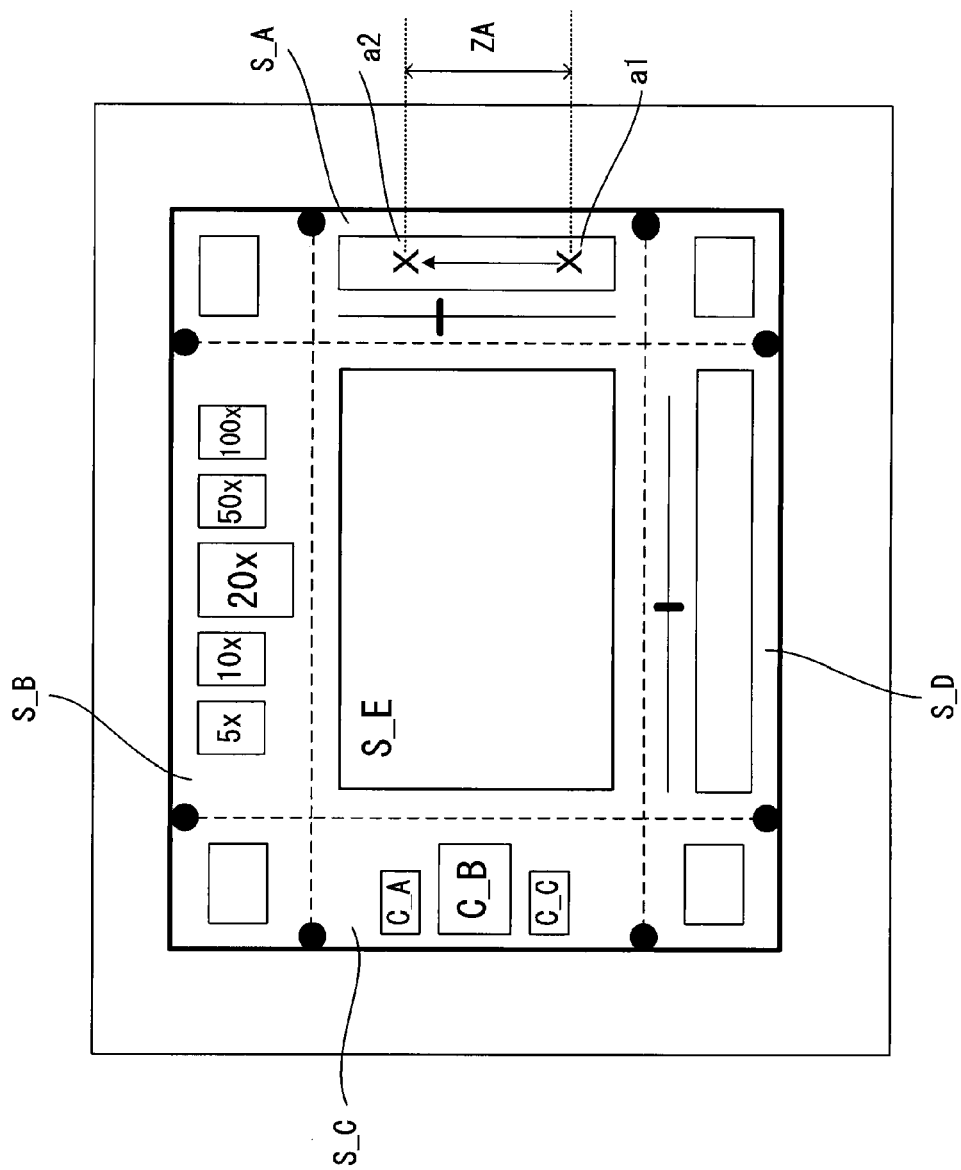
FIG. 10A is an explanatory view (No. 2) of an operation for the functional area S_A to which the function of moving the stage in the Z direction is assigned.
Figure 10B:
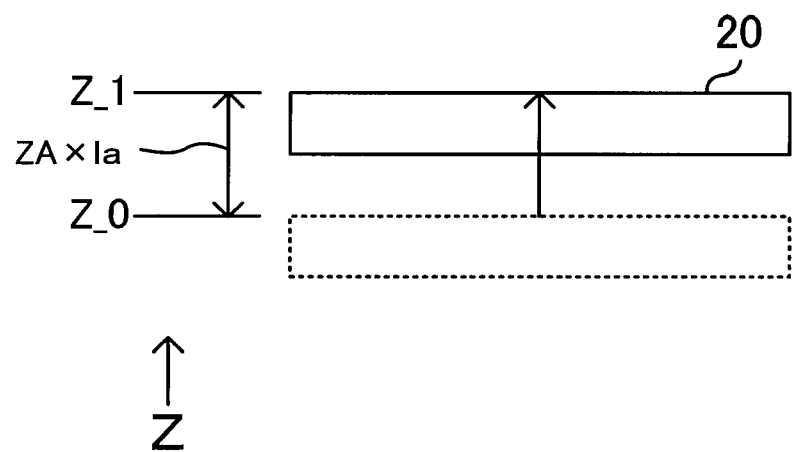
FIG. 10B is an explanatory view (No. 2) of a move of the stage in the Z direction as a result of the operation.

Here, if the drag operation is performed from the point a1 to the point a2 by a distance ZA as illustrated in FIG. 10A, a control for moving the stage 20 toward the objective lens 23 from a coordinate $Z\_0$ to a coordinate $Z\_1$ by a distance $ZA \times 1a$ is performed (FIG. 10B).

Figure 11A:
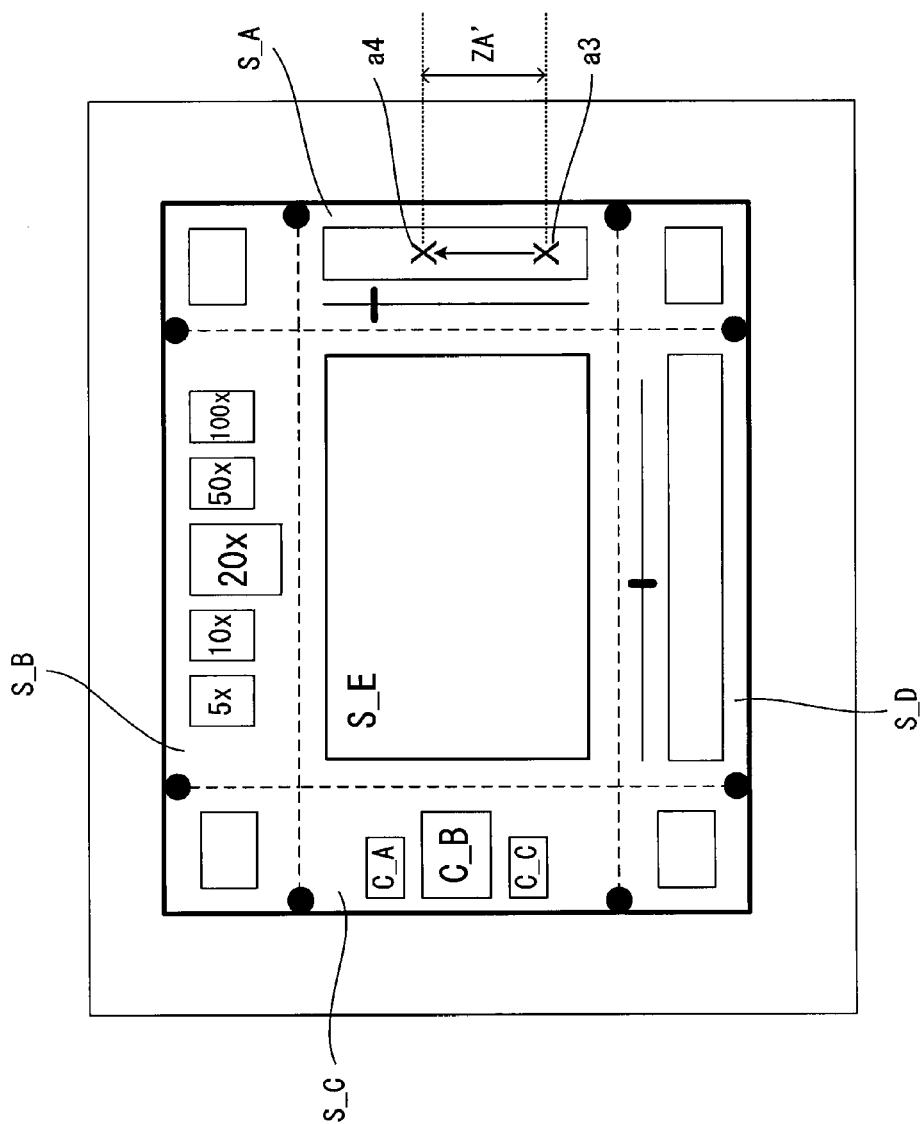
FIG. 11A is an explanatory view (No. 3) of an operation for the functional area S_A to which the function of moving the stage in the Z direction is assigned.

If the drag operation is performed from a point a3 to a point a4 by a distance ZA' as illustrated in FIG. 11A in the state illustrated in FIG. 10B, a control for further moving the stage 20 toward the objective lens 23 from the coordinate $Z\_1$ to a coordinate $Z\_2$ by a distance $ZA \times 1a$ is performed (FIG. 11B). Note that the position of the stage 20 moves with the position being dragged during the drag operation.

Figure 12A:
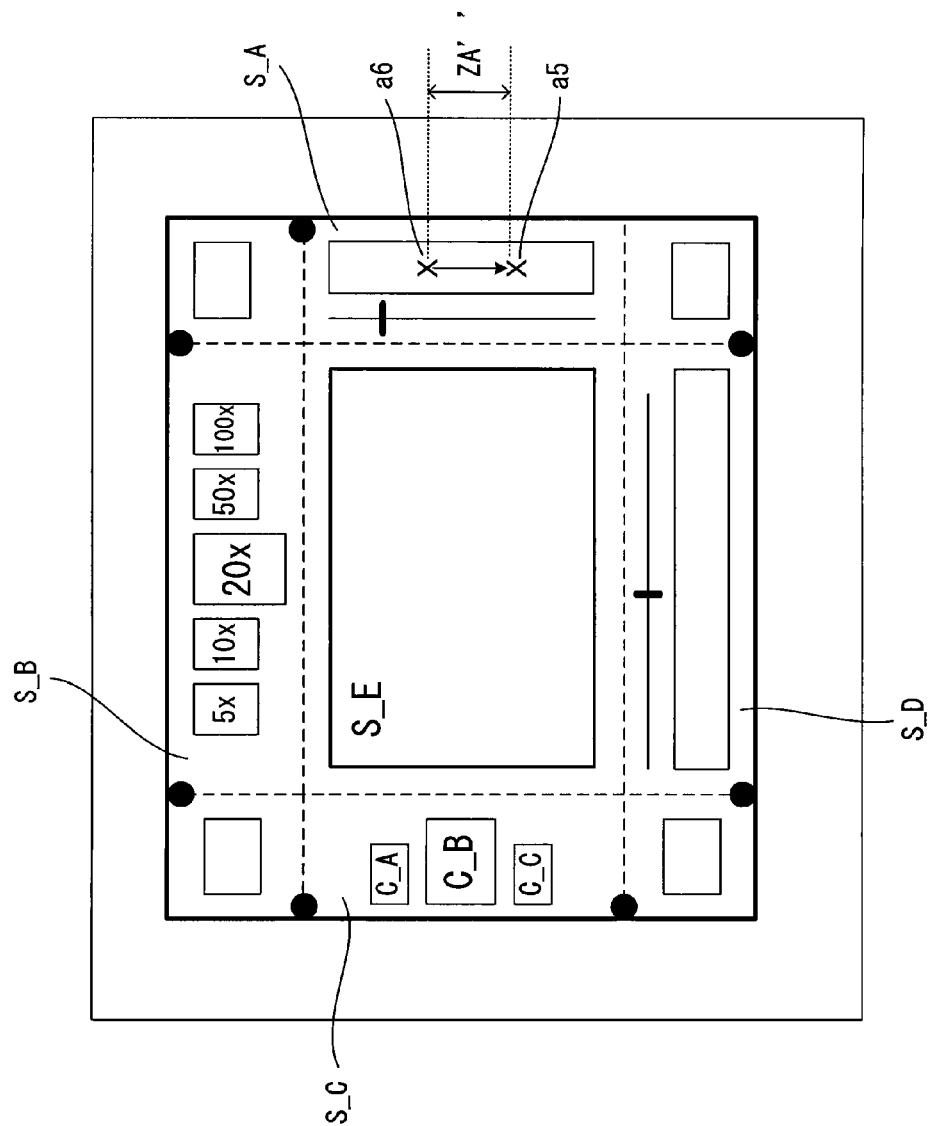
FIG. 12A is an explanatory view (No. 4) of an operation for the functional area S_A to which the function of moving the stage in the Z direction is assigned.
Figure 12B:
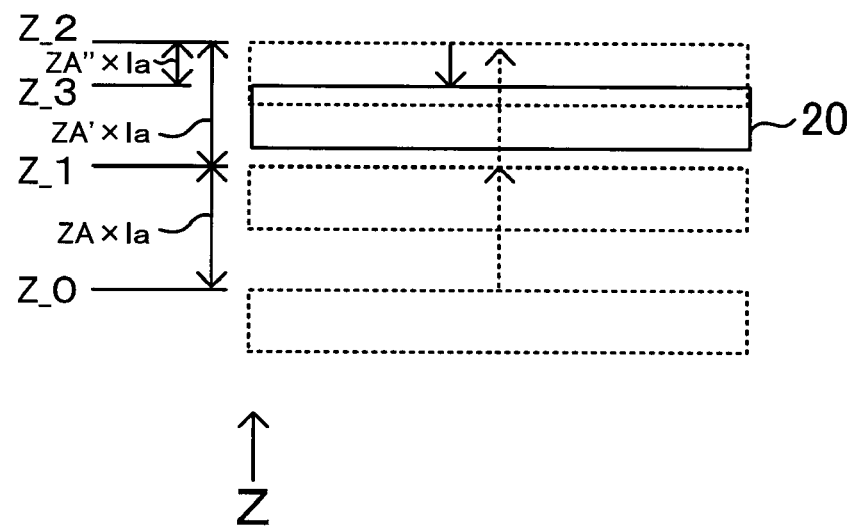
FIG. 12B is an explanatory view (No. 4) of a move of the stage in the Z direction as a result of the operation.

If the drag operation is performed from a point a6 to a point a5 in a reverse direction by a distance ZA" as illustrated in FIG. 12A in the state illustrated in FIG. 11B, a control is performed so that the stage 20 draws apart from the objective lens 23 from the coordinate $Z\_2$ to a coordinate $Z\_3$ by a distance $ZA" \times 1a$ (FIG. 12B).

Figure 13A:
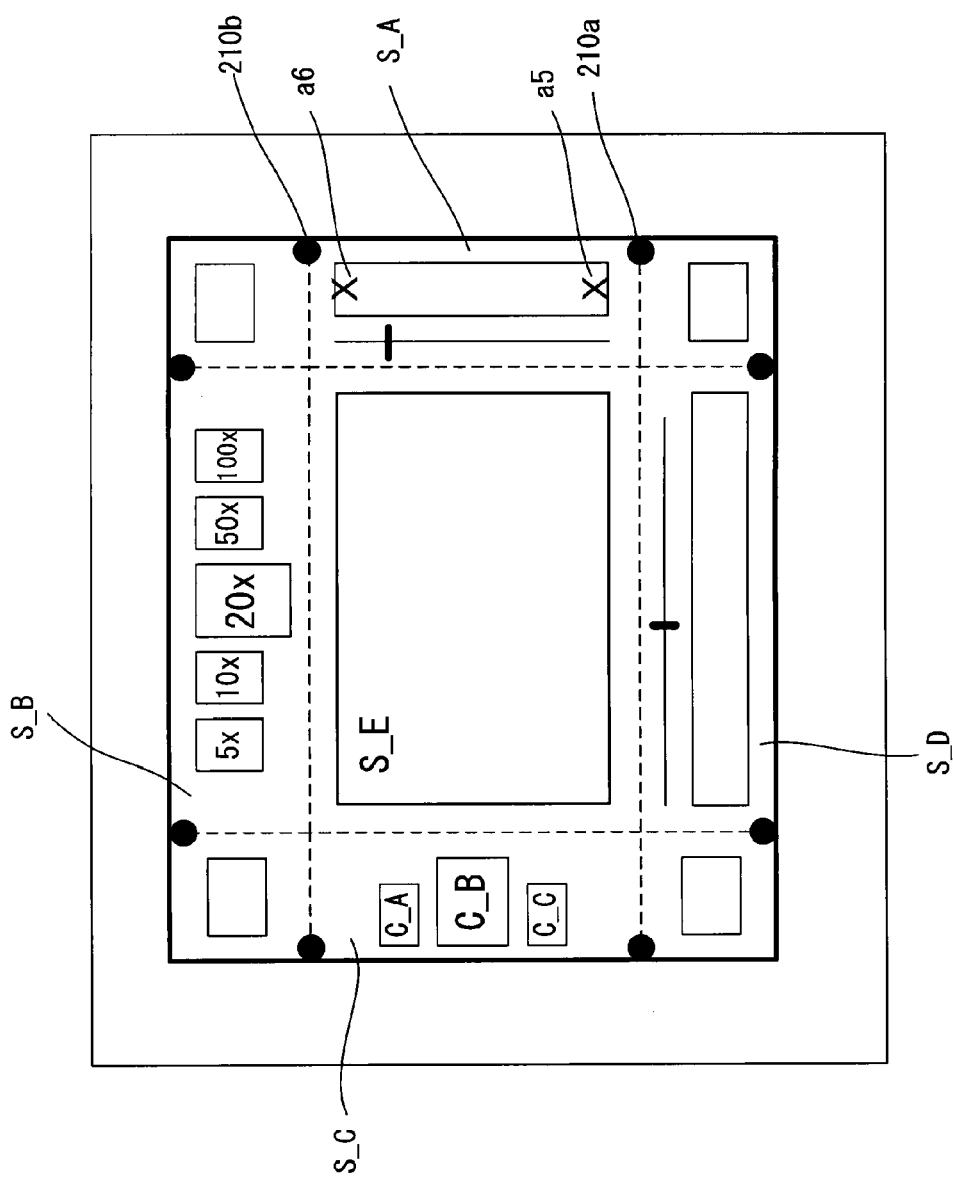
FIG. 13A is an explanatory view (No. 5) of an operation for the functional area S_A to which the function of moving the stage in the Z direction is assigned.
Figure 13B:
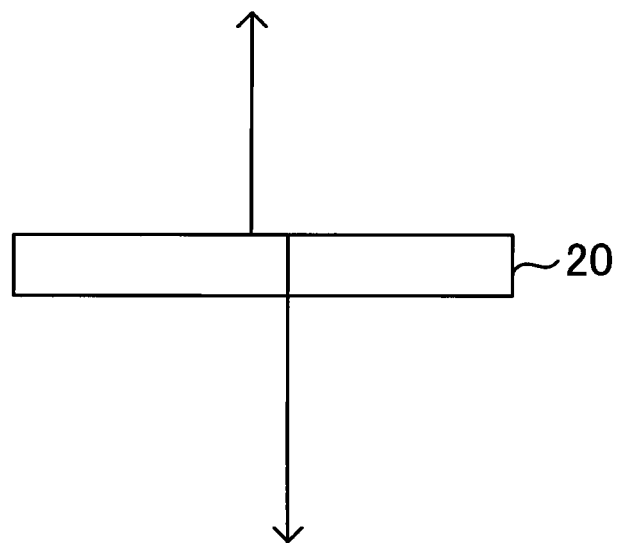
FIG. 13B is an explanatory view (No. 5) of a move of the stage in the Z direction as a result of the operation.

Furthermore, the point a5 that is a point in the vicinity of the protrusion 210a is pressed for a predetermined duration of t_a in the functional area S_A as illustrated in FIG. 13A. Then, the microscope controller 2 controls the driving of the stage 20 so that the stage 20 draws apart from the objective lens 23. As a result, the stage 20 moves downward in FIG. 13B. Moreover, the point a6 that is a point in the vicinity of the protrusion 210b is pressed for the predetermined duration of t_a as illustrated in FIG. 13A. Then, the microscope controller 2 controls the driving of the stage 20 so that the stage 20 gets closer to the objective lens 23. As a result, the stage 20 moves upward in FIG. 13B.

This embodiment has been described by assuming that the coefficient 1a is a fixed value. However, the coefficient 1a may be switched. Namely, the coefficient 1a may be variable for each of the objective lenses 23.

Switching operations of the motorized revolver 24 are described next with reference to FIGS. 14 to 19. A case where an objective lens 23a with 5× magnification, an objective lens 23b with 10× magnification, an objective lens 23c with 20× magnification, an objective lens 24d with 50× magnification, and an objective lens 23e with 100× magnification are attached to the motorized revolver 24, and the objective lens 23c with 20× magnification is inserted in the optical axis as illustrated in FIG. 14B is described.

Figure 14A:
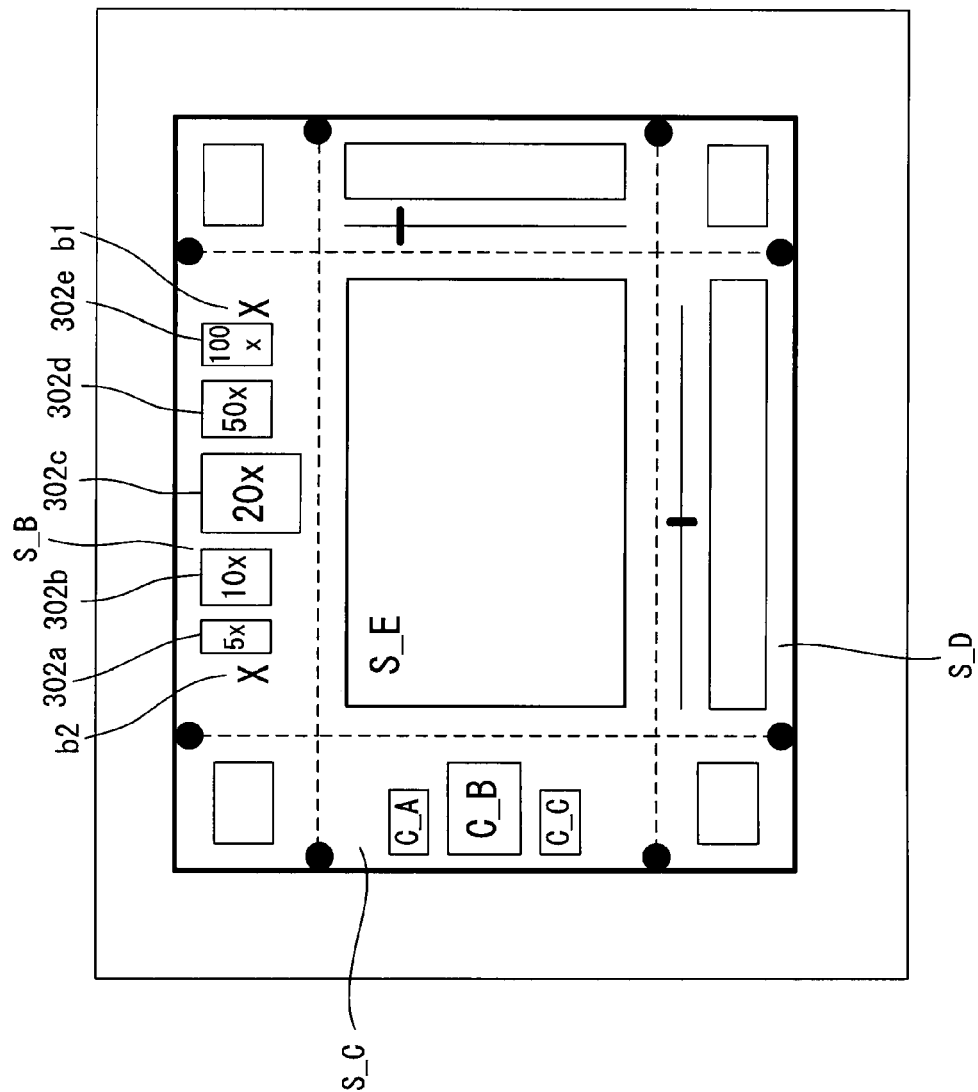
FIG. 14A is an explanatory view (No. 1) of an operation for a functional area S_B to which a function of switching among objective lenses with a motorized revolver is assigned.
Figure 14B:
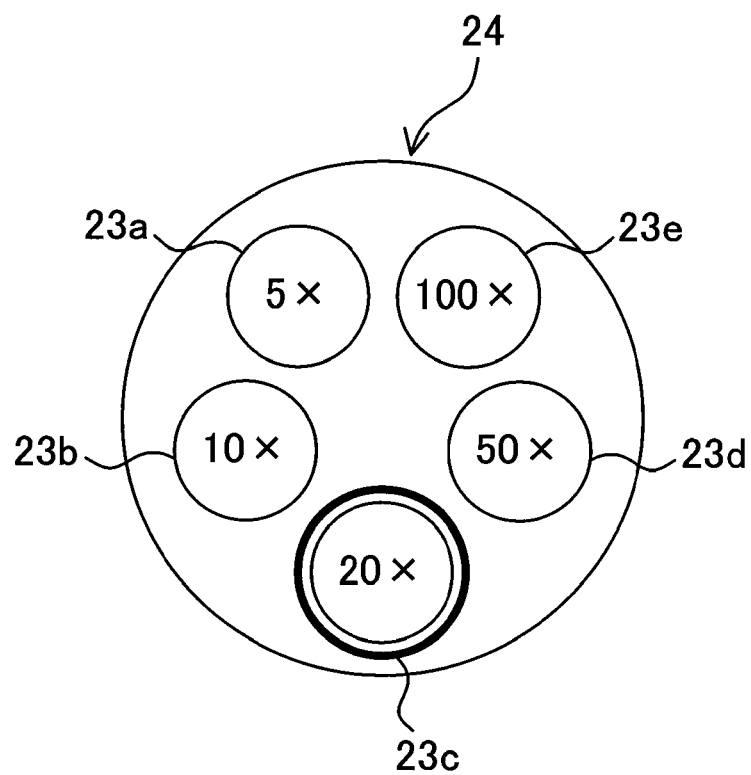
FIG. 14B is an explanatory view (No. 1) of positions of the objective lenses arranged on the motorized revolver as a result of the operation.

As illustrated in FIG. 14A, icons 302a to 302e that respectively represent the objective lenses 23a to 23e attached to the motorized revolver 24 are depicted in the area S_B. FIG. 14A represents that the objective lens represented by the icon 302c is an objective lens currently inserted in the optical path, and is enlarged and displayed at the center. Here, information of the objective lens 23c with 20× magnification is displayed.

A user touches the vicinity of a point b1 illustrated in FIG. 14A in the functional area S_B, and performs a drag operation (an operation for moving the touch a finger toward a point b2 while touching the panel) toward the point b2 along the restriction frame 209, or performs an operation for quickly moving the finger toward the point b2 while touching the touch panel.

Then, the microscope controller 2 instructs the microscope controlling unit 31 so that the motorized revolver 24 performs a rotation control. As illustrated in FIG. 15B, the motorized revolver 24 inserts the objective lens 23d with 50× magnification in the optical path by switching from the objective lens 23c with 20× magnification to the objective lens 23d with 50× magnification. Then, a display of the icon that represents the objective lens currently inserted in the optical path is switched from the icon 302 to the icon that represents the objective lens 23d with 50× magnification.

The functional area S_B has a function of detecting a switching direction of an objective lens on the basis of a drag operation. Accordingly, a similar operation is performed also when a user touches the vicinity of the point b3 and performs a drag operation toward the point b2 along the restriction frame 209 as illustrated in FIG. 15A.

Figure 15A:
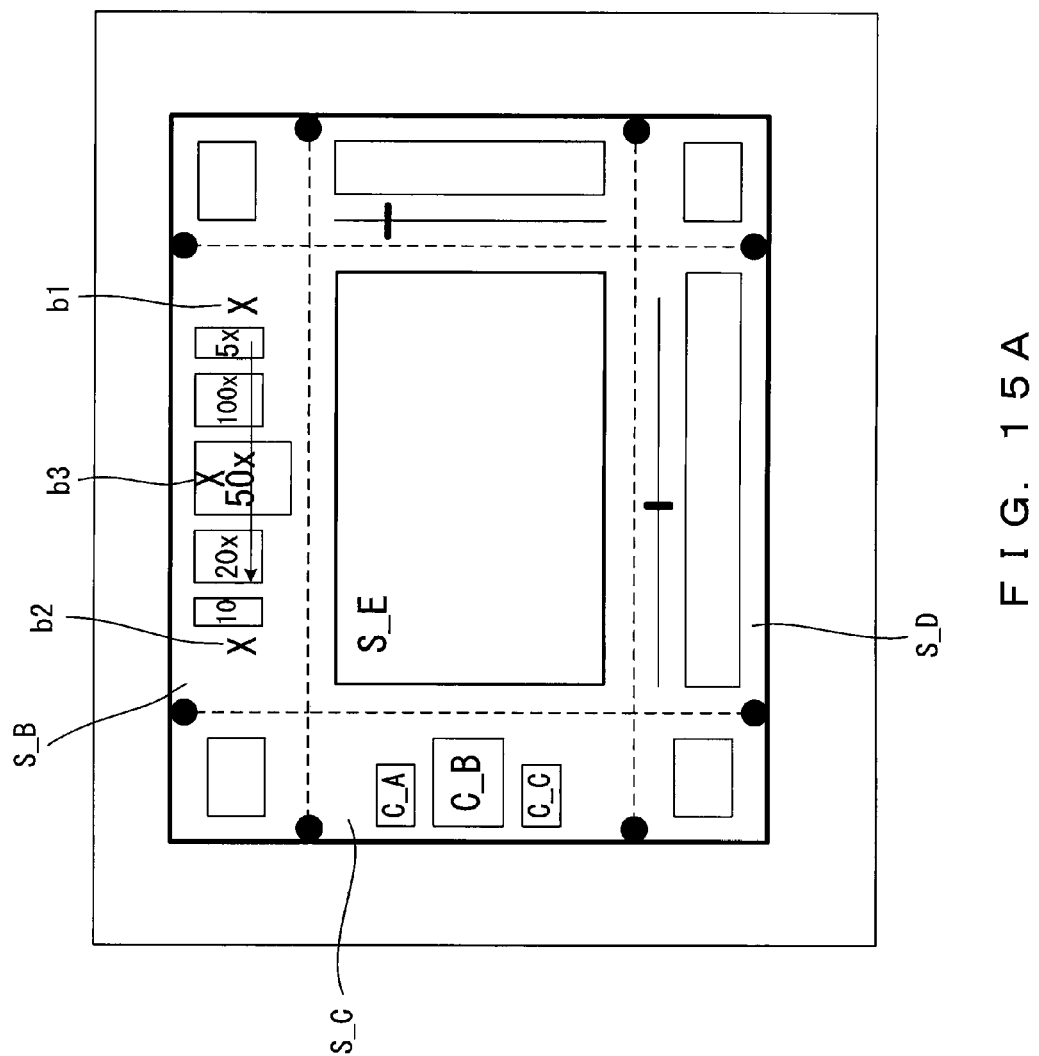
FIG. 15A is an explanatory view (No. 2) of an operation for the functional area S_B to which the function of switching among the objective lenses with the motorized revolver is assigned.
Figure 15B:
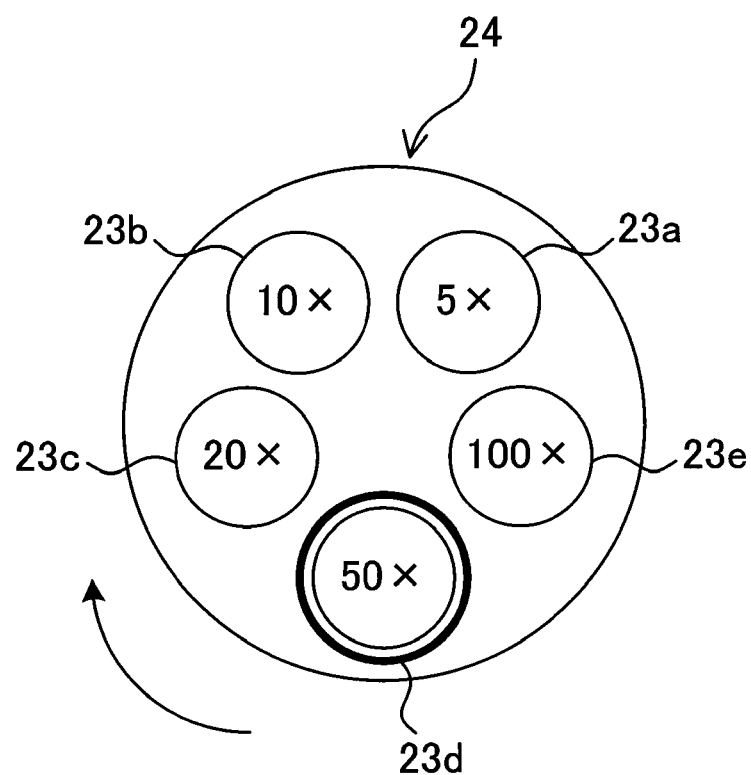
FIG. 15B is an explanatory view (No. 2) of positions of the objective lenses arranged on the motorized revolver as a result of the operation.

The user again touches the point b1 in the functional area S_B in the state illustrated in FIG. 15A, and performs a drag operation toward the point b2 along the restriction frame 209. Then, the microscope controller 2 instructs the microscope controlling unit 31 so that the motorized revolver 24 performs a rotation control. As illustrated in FIG. 16B, the motorized revolver 24 inserts the objective lens 23e with 100× magnification in the optical path by switching from the objective lens 23d with 50× magnification to the objective lens 23e with 100× magnification. A display of the icon 302 that represents the objective lens currently inserted in the optical path is switched from 302c to the icon 302e that represents the objective lens 23e with 100× magnification (FIG. 16A).

Figure 16A:
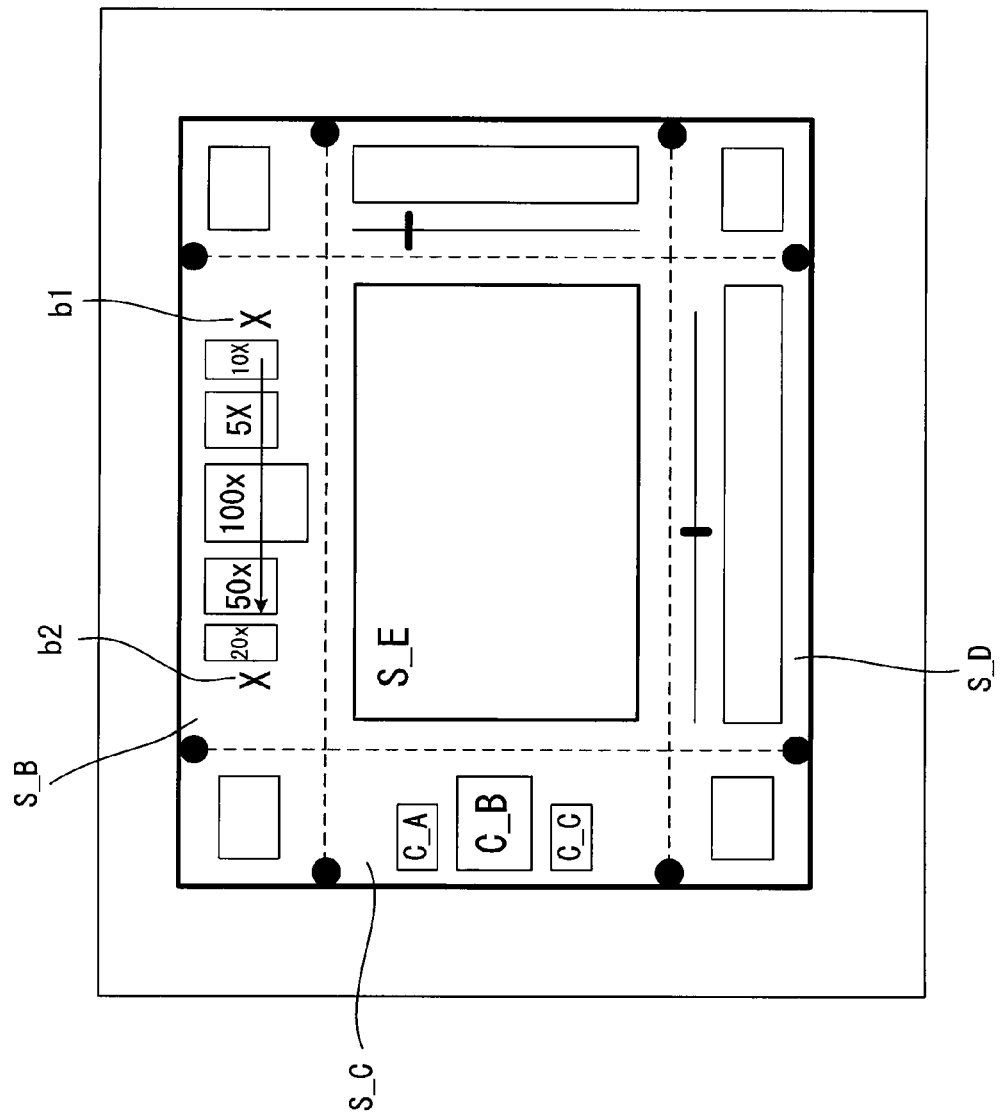
FIG. 16A is an explanatory view (No. 3) of an operation for the functional area S_B to which the function of switching among objective lenses with the motorized revolver is assigned.
Figure 16B:
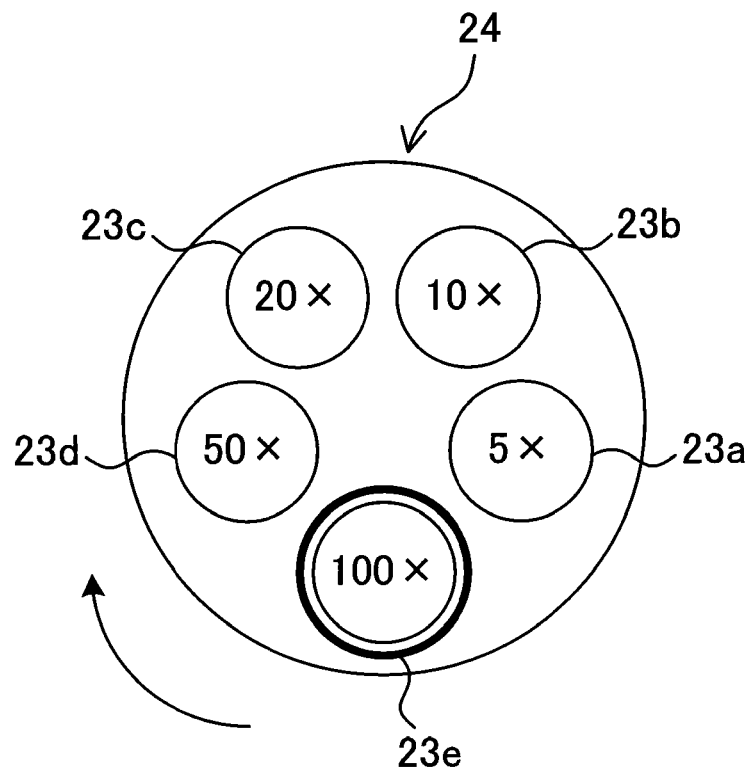
FIG. 16B is an explanatory view (No. 3) of positions of the objective lenses arranged on the motorized revolver as a result of the operation.
Figure 17A:
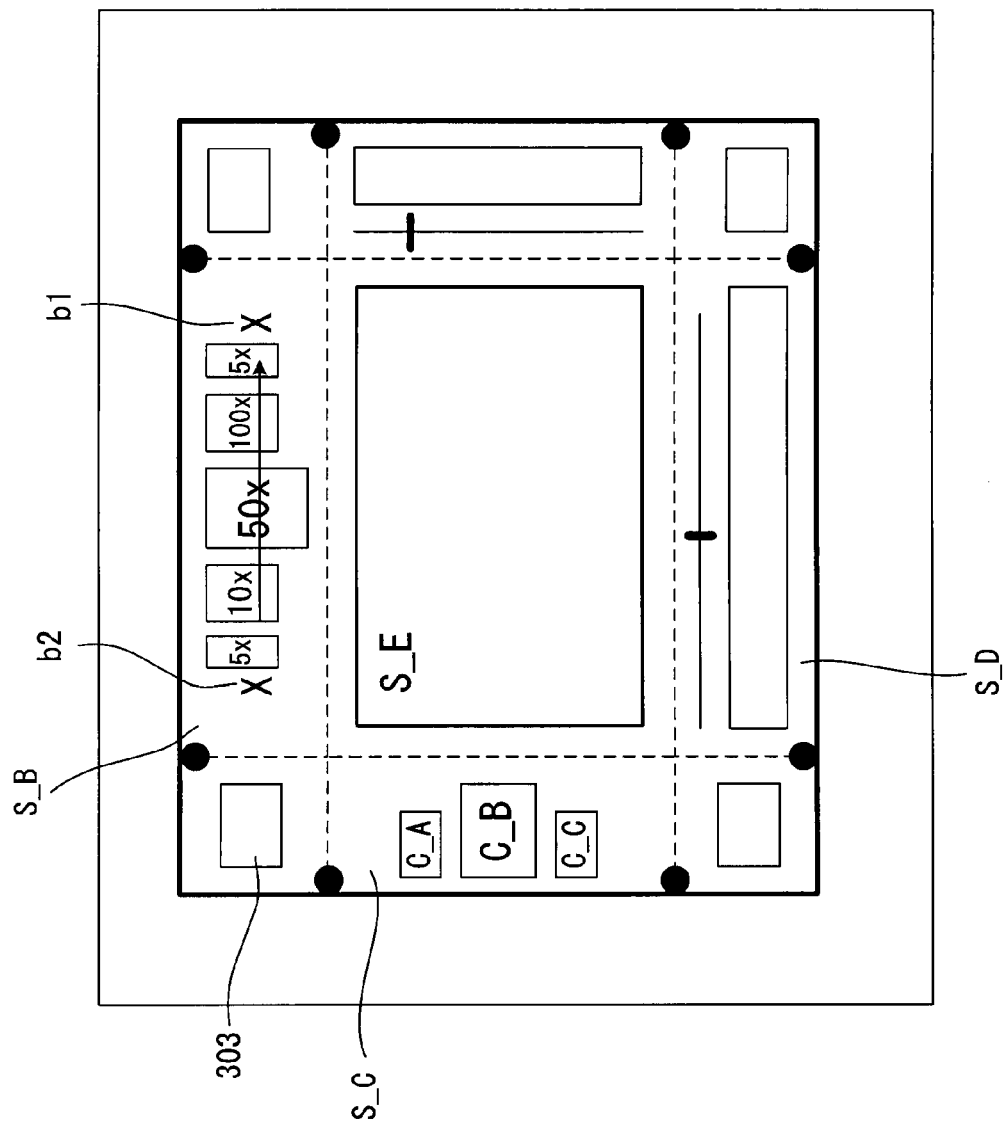
FIG. 17A is an explanatory view (No. 4) of an operation for the functional area S_B to which the function of switching among the objective lenses with the motorized revolver is assigned.

The user touches the point b2 in the functional area S_B in the state illustrated in FIG. 16A, and performs a drag operation toward the point b1 along the restriction frame 209. Then, the microscope controller 2 instructs the microscope controlling unit 31 so that the motorized revolver 24 performs a rotation control. As illustrated in FIG. 17B, the motorized revolver 24 inserts the objective lens 23d with 50× magnification in the optical path by switching from the objective lens 23e with 100× magnification to the objective lens 23d with 50× magnification. Then, a display of the icon 302 that represents the objective lens currently inserted in the optical path is switched from 302c to the icon 302d that represents the objective lens 23d with 50× magnification (FIG. 17A).

The functional area S_B has the function of detecting a switching direction of an objective lens on the basis of a drag operation. The function of detecting a switching direction of an objective lens on the basis of a drag operation can be switched by pressing a function switching button 303 arranged in the functional area S_H as illustrated in FIG. 18A.

Figure 18A:
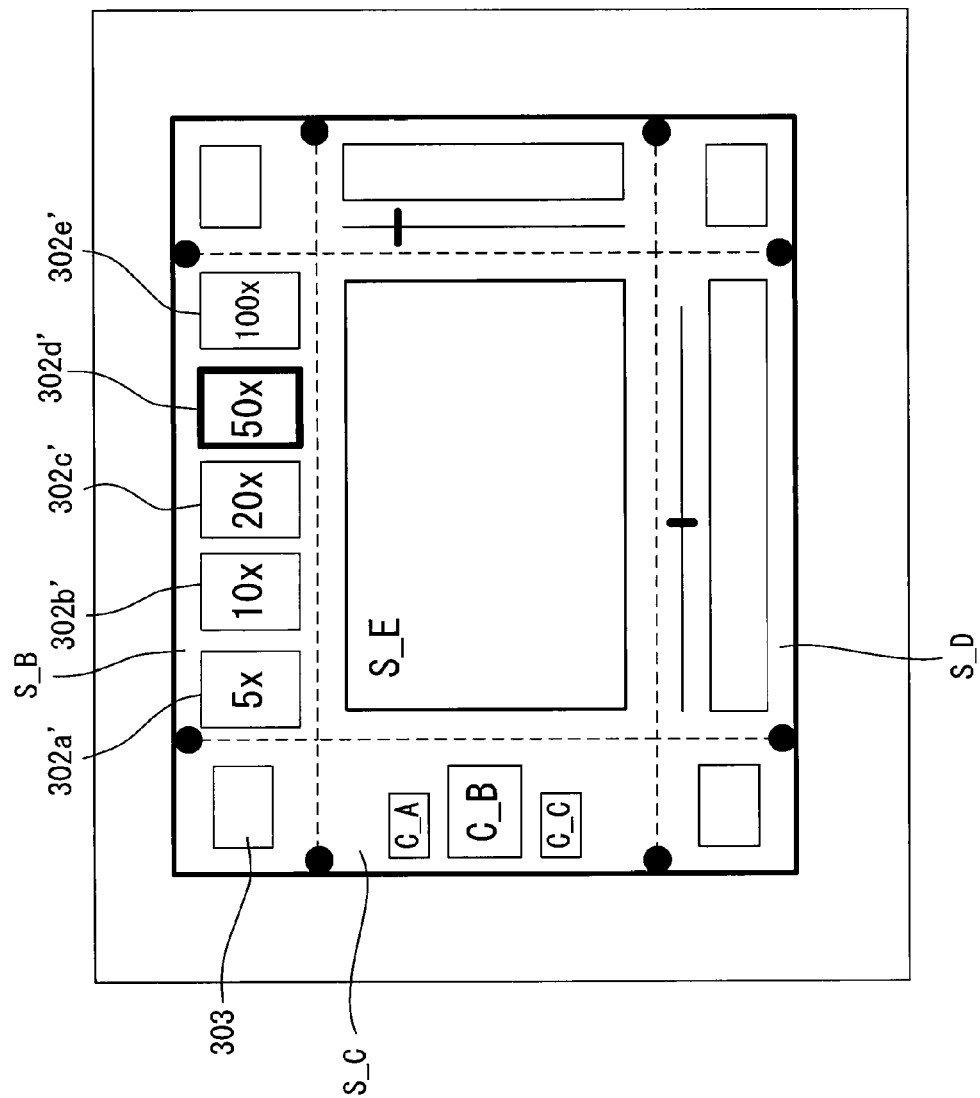
FIG. 18A is an explanatory view (No. 5) of an operation for the functional area S_B to which the function of switching among the objective lenses with the motorized revolver is assigned.
Figure 18B:
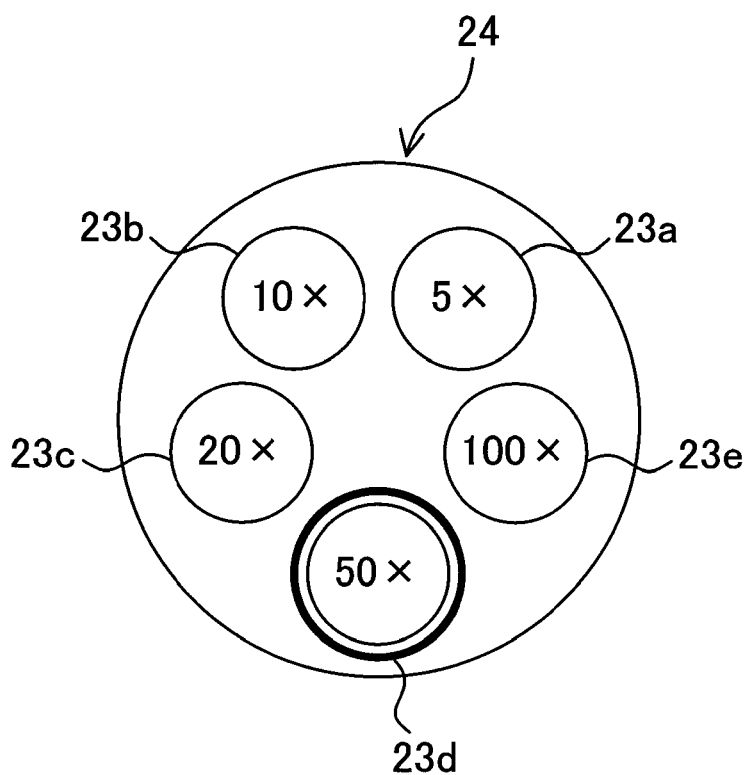
FIG. 18B is an explanatory view (No. 5) of positions of the objective lenses arranged on the motorized revolver as a result of the operation.

In FIG. 17A, when the function switching button 303 is pressed, the icons 302a to 302e displayed in the functional area S_B are respectively changed to icons 302a' to 302e' illustrated in FIG. 18A. With the press of any of the icons 302a' to 302e', switching can be directly made to a corresponding objective lens 23 (FIG. 18B).

The icon of the objective lens inserted in the optical path is distinguishable from the other icons. Here, FIG. 18B illustrates the state where the objective lens 23d with 50× magnification is inserted in the optical path by a cursor indicating that 302d' is selected.

Figure 19A:
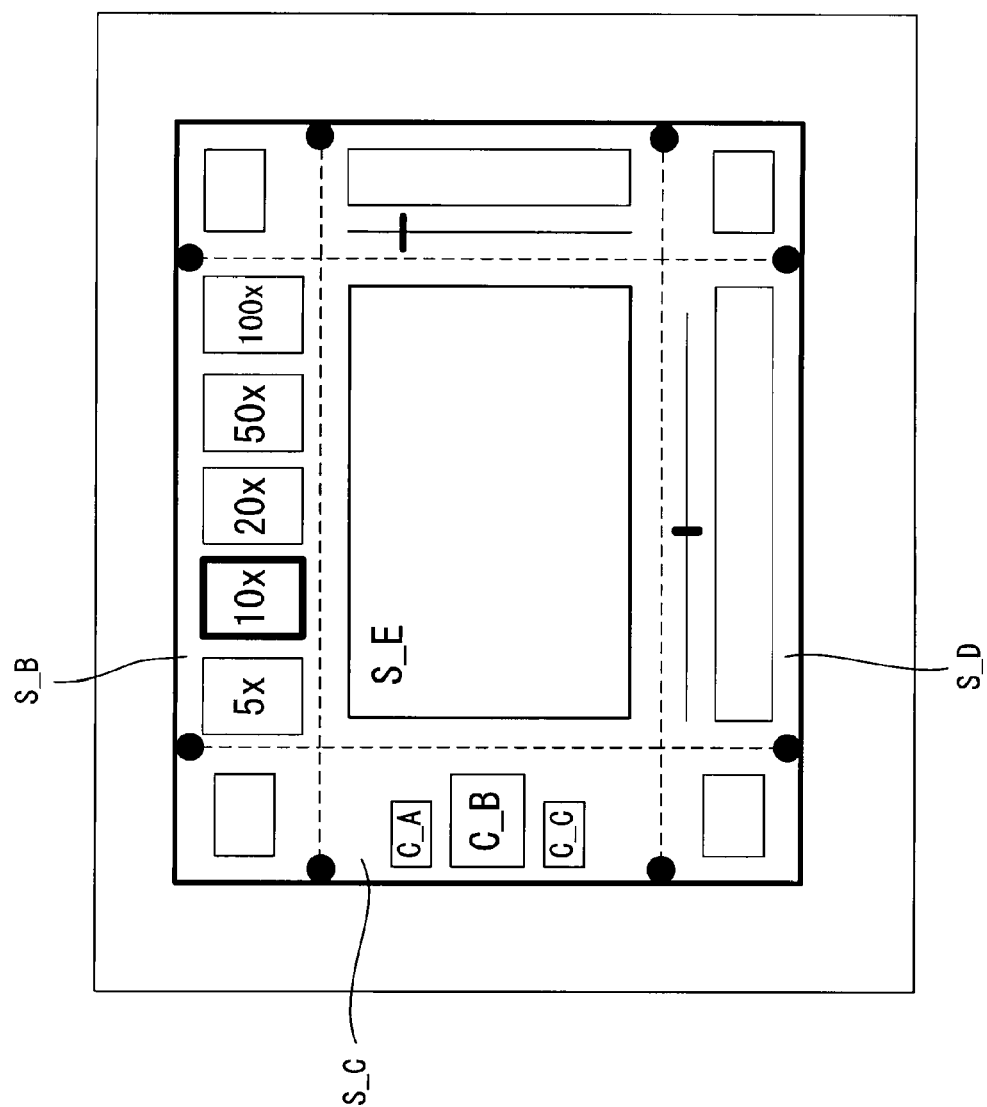
FIG. 19A is an explanatory view (No. 6) of an operation for the functional area S_B to which the function of switching among the objective lenses with the motorized revolver is assigned.
Figure 19B:
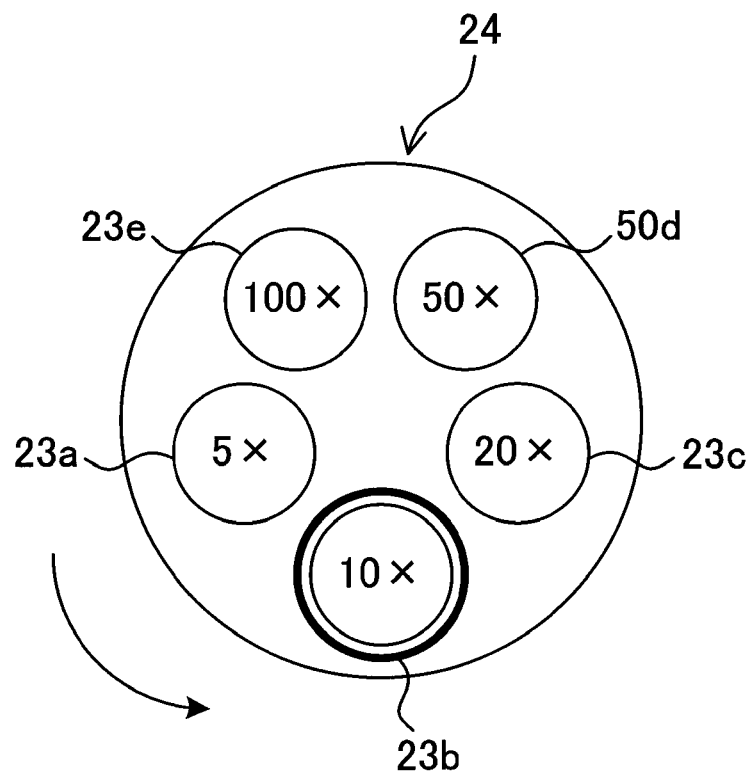
FIG. 19B is an explanatory view (No. 6) of positions of the objective lenses arranged on the motorized revolver as a result of the operation.

When the icon 302b' is pressed in FIG. 18A, the microscope controller 2 instructs the microscope controlling unit 31 so that the motorized revolver 24 performs a rotation control as illustrated in FIG. 19B. The motorized revolver 24 inserts the objective lens 23b with 10× magnification in the optical path by switching from the objective lens 23d with 50× magnification to the objective lens 23b with 10× magnification on the basis of this instruction.

The functional area S_C supports a switching operation of the fluorescence cubes 35 attached to the motorized cube turret 25. Since this operation is similar to the above described switching operation of the objective lenses 23, its explanation is omitted.

Figure 20:
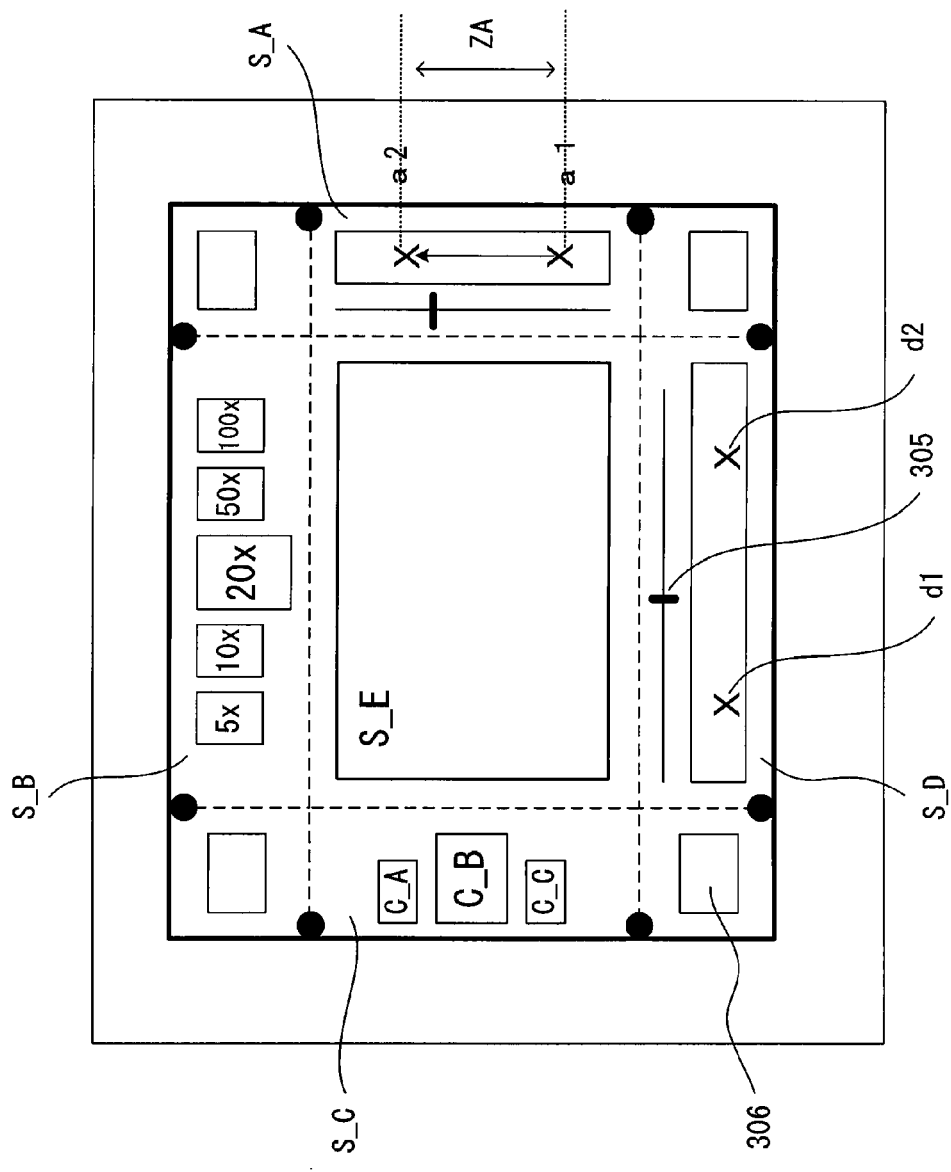
FIG. 20 is an explanatory view of operations for a functional area S_D to which a function of controlling dimming of a transmission illumination light source or an epi-illumination light source is assigned.

For dimming operations of the transmission illumination light source 6 and the epi-illumination light source 13, which are controlled by the microscope controlling unit 31, the functional area S_D is used as illustrated in FIG. 20.

FIG. 20 is an explanatory view of operations performed in the functional area S_D to which a function of controlling the dimming of the transmission illumination light source 6 or the epi-illumination light source 13 is assigned. By performing a drag operation from d1 toward d2 in the functional area S_D in a similar manner as in the above described functional area S_A, a control for increasing the amount of light can be performed. Moreover, by performing a drag operation from d2 toward d1, a control for decreasing the amount of light can be performed.

For example, if a drag operation is performed in the functional area S_D, the microscope controller 2 instructs the microscope controlling unit 31 so that the transmission illumination light source 6 or the epi-illumination light source 13 controls the dimming in accordance with the direction of the drag operation.

As a slider of the bar 305 becomes closer to the right, the amount of light increases. As the slider becomes closer to the left, the amount of light decreases. Each time the button 306 is pressed, switching can be made between the dimming of the transmission illumination light source 6 and that of the epi-illumination light source 13.

Operations of the stage 20 in the X-Y direction are described next.

Figure 21:
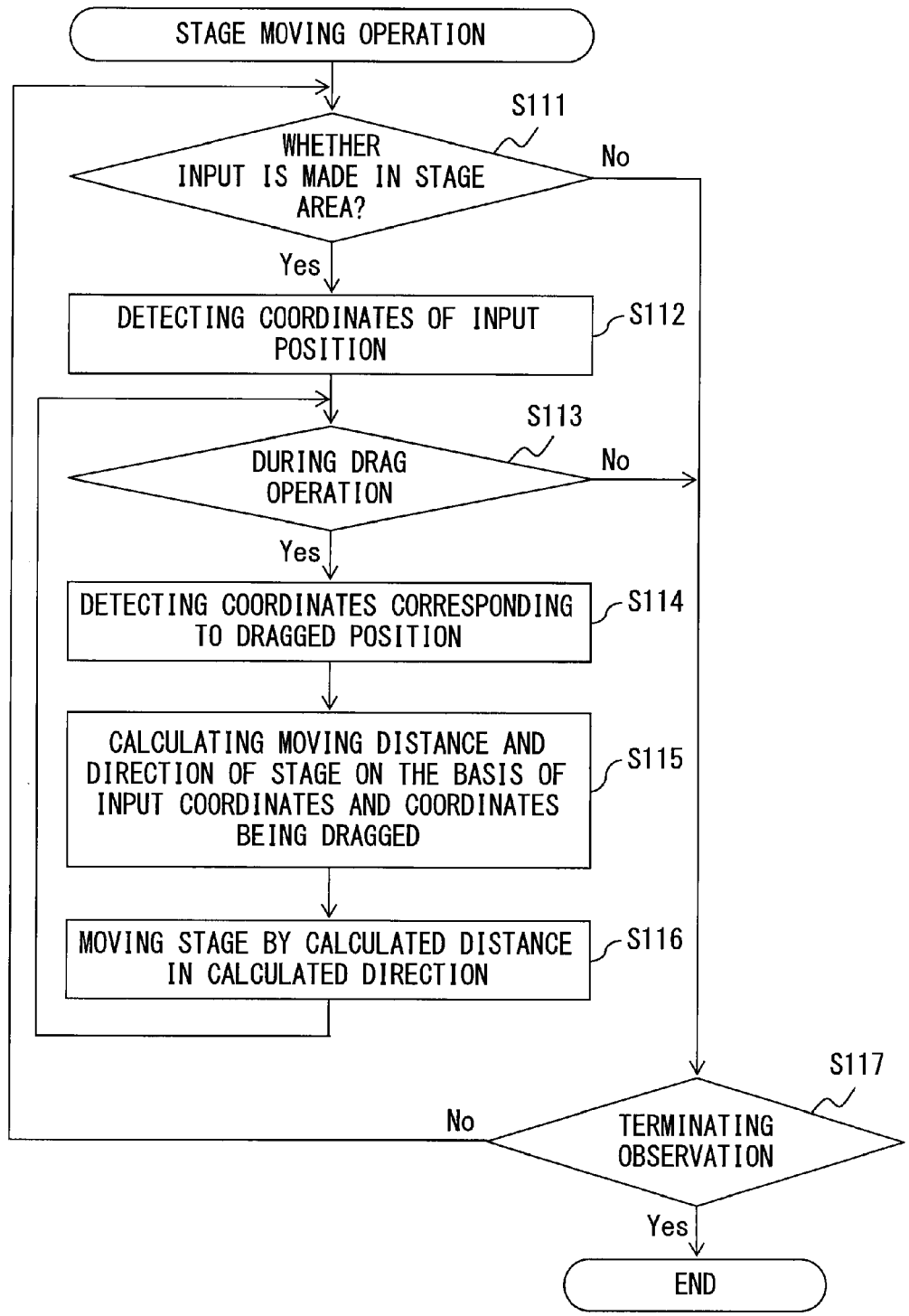
FIG. 21 is a flow of operations of a microscope controller when a drag operation is performed in a functional area S_E in this embodiment.

FIG. 21 is a flow of operations of the microscope controller when a drag operation is performed in the functional area S_E in this embodiment. When a user performs a drag operation in the functional area S_E in FIG. 22A ("YES" in S111), the touch panel controlling unit 206 detects X and Y coordinates of the position of the input (S112). The touch panel controlling unit 206 transmits the detected coordinate information to the CPU 201.

While the drag operation is being performed ("YES" in S113), the touch panel controlling unit 206 detects coordinates corresponding to the position being dragged (S114). The touch panel controlling unit 206 transmits the detected coordinate information to the CPU 201.

The CPU 201 calculates a moving distance and a moving direction of the stage in accordance with the input coordinates and coordinates being dragged on the basis of the coordinate information transmitted from the touch panel controlling unit 206 (S115).

The CPU 201 instructs the stage X driving controlling unit 21 via the microscope controlling unit 31 so that the stage is moved by a calculated distance in a calculated direction (S116). The processes in S114 to S116 are repeated until the drag operation is terminated.

If no input is made in the functional area S_E ("NO" in S111) or if a drag operation is not being performed ("NO" in S113), whether or not to terminate an observation is determined (S117). If the observation is determined to continue, the flow goes back to S111.

A control that the CPU 201 performs according to an operation of the touch panel 207 is described in detail below with reference to the flow illustrated in FIG. 21. Operations of the stage 20 in the X-Y direction are described with reference to FIGS. 22 to 25.

Figure 22A:
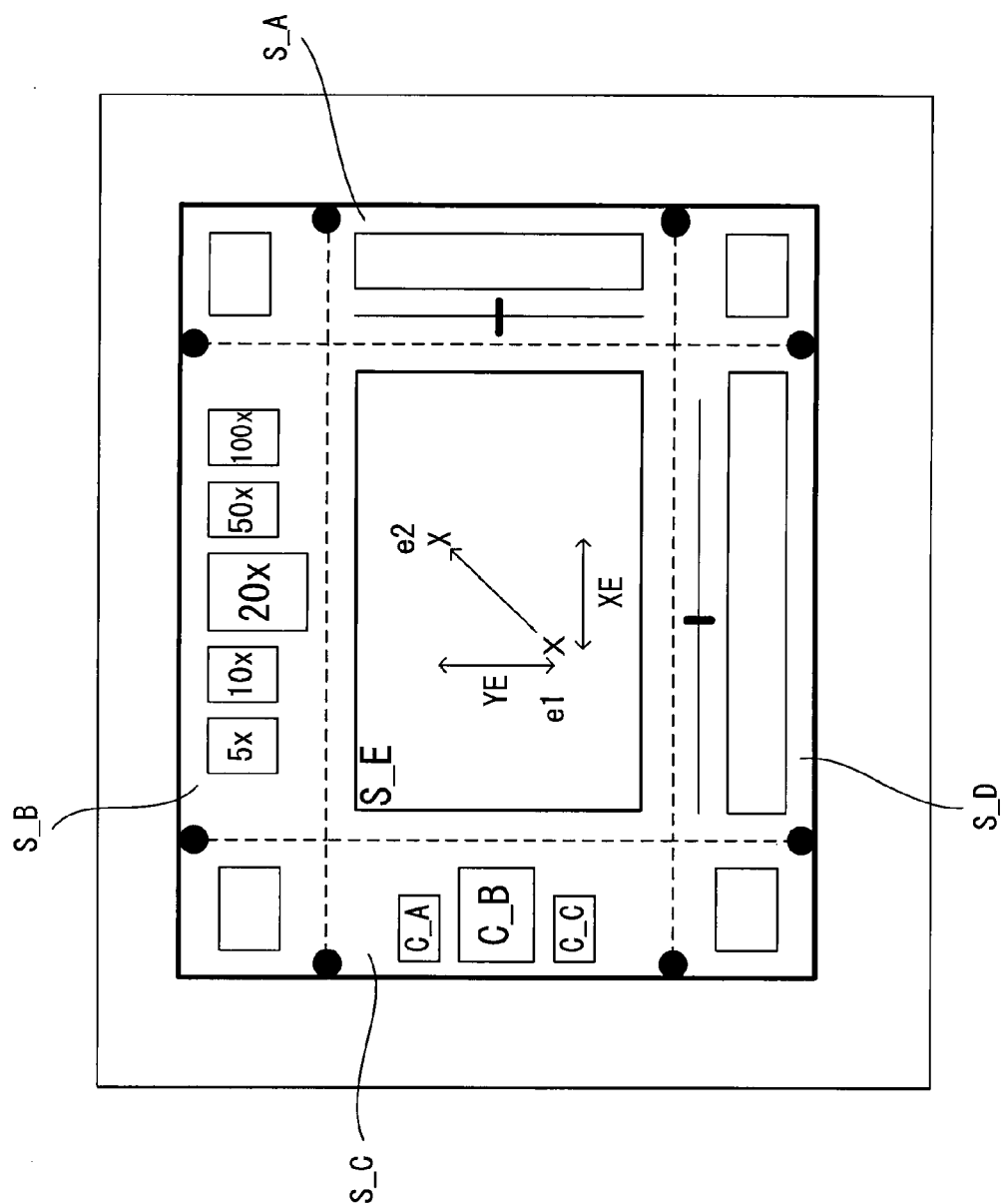
FIG. 22A is an explanatory view (No. 1) of an operation for the functional area S_E to which a function of moving the stage in an X-Y direction is assigned.
Figure 22B:
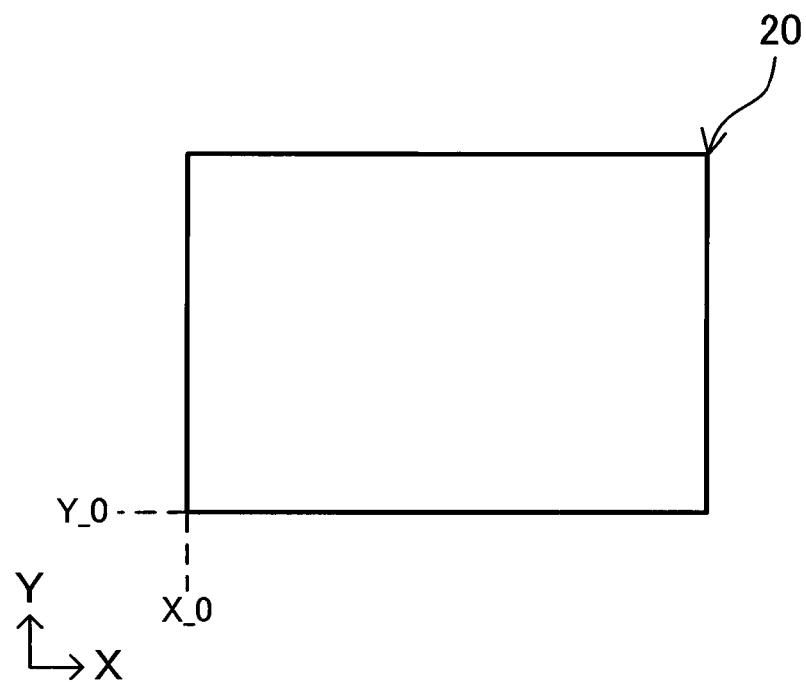
FIG. 22B is an explanatory view (No. 2) of a move of the stage in the X-Y direction as a result of the operation.

The microscope controller 2 issues an instruction to the stage X driving controlling unit 21 via the microscope controlling unit 31. Then, the stage X driving controlling unit 21 controls the stage 20 so that the stage 20 is moved by a distance and a direction, which correspond to those of a drag operation, as illustrated in FIG. 22A (FIG. 22B).

The moving distance of the stage 20 in the X-Y direction corresponds to the distance of the drag operation performed in the functional area S_E on the touch panel 207. The microscope controller 2 instructs the microscope controlling unit 31 so that the stage 20 moves by a distance obtained by multiplying the distance on the touch panel 20 by a coefficient $1e$.

Figure 23A:
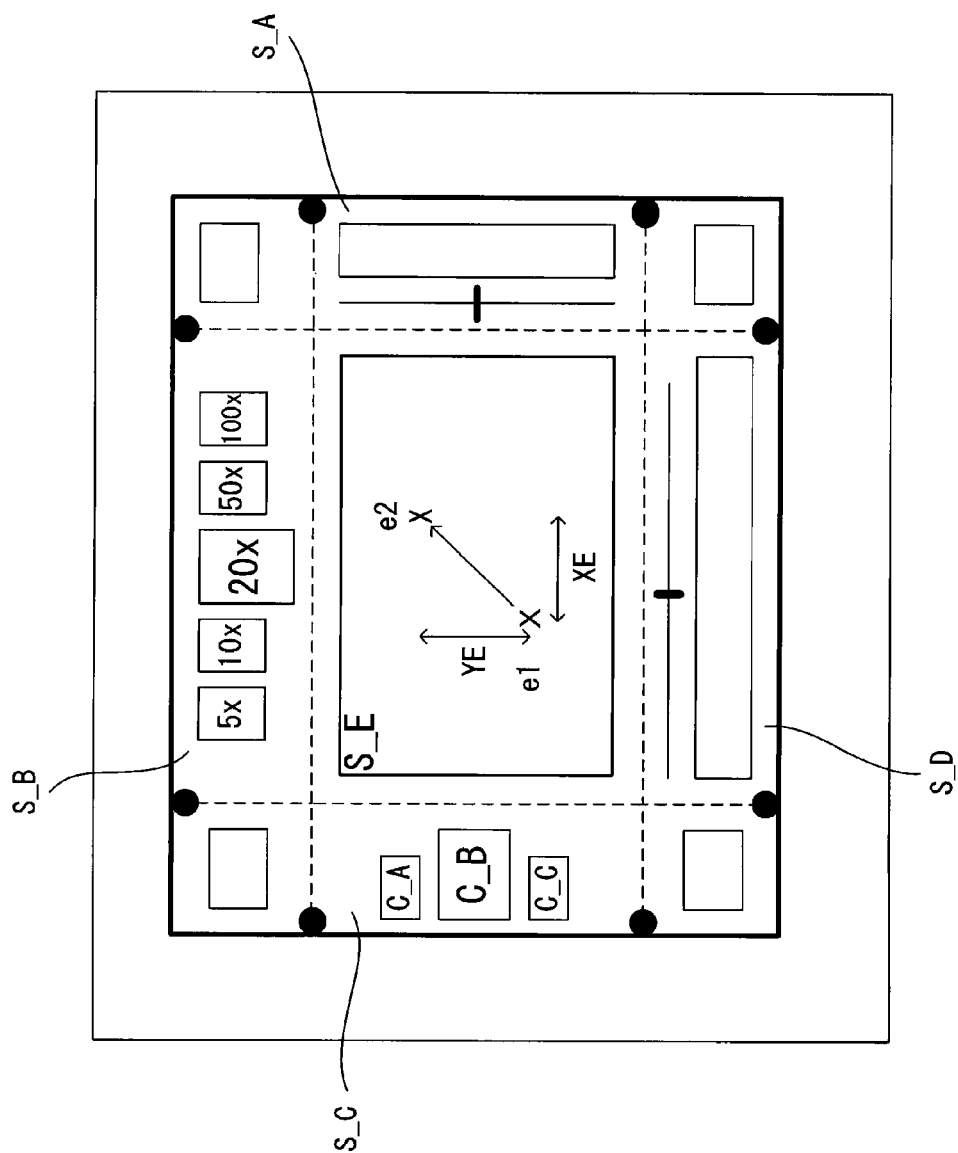
FIG. 23A is an explanatory view (No. 2) of an operation for the functional area S_E to which the function of moving the stage in the X-Y direction is assigned.
Figure 23B:
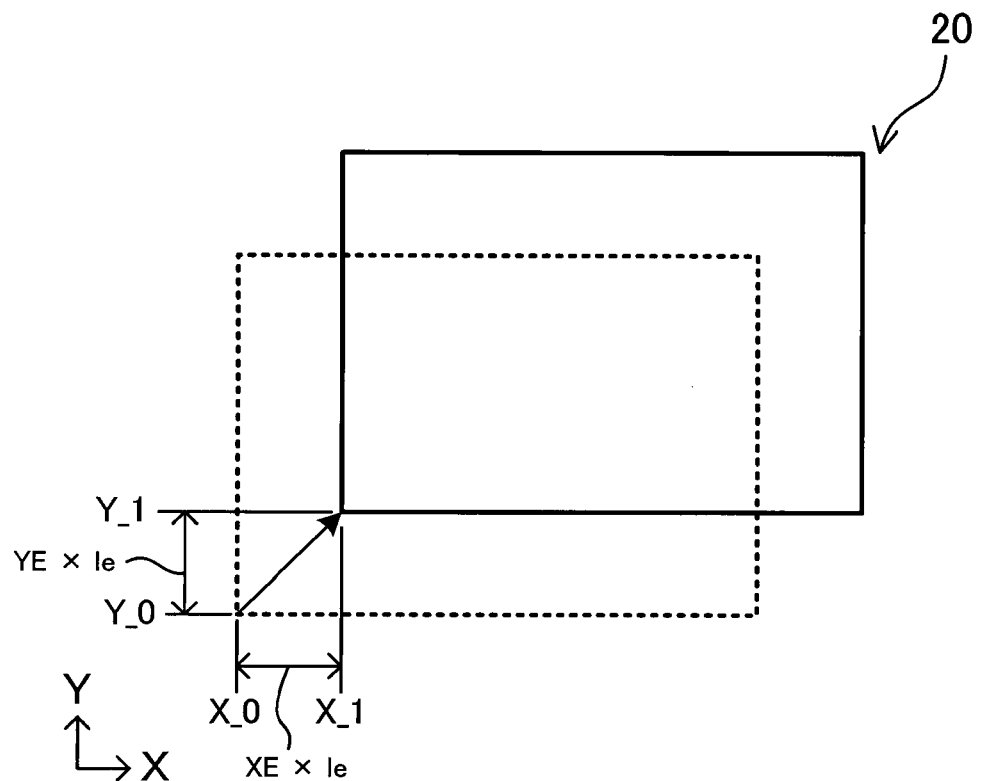
FIG. 23B is an explanatory view (No. 2) of a move of the stage in the X-Y direction as a result of the operation.

Here, the drag operation is performed by a distance XE in the X direction and by a distance YE in the Y direction from a point e1 to a point e2 as illustrated in FIG. 23A. Then, a control for moving the stage 20 by a distance XE×$1e$ from a coordinate X_0 to X_1 in the X direction is performed, and a control for moving the stage 20 by a distance YE×$1e$ from a coordinate Y_0 to Y_1 in the Y direction is performed (FIG. 23B).

Figure 24A:
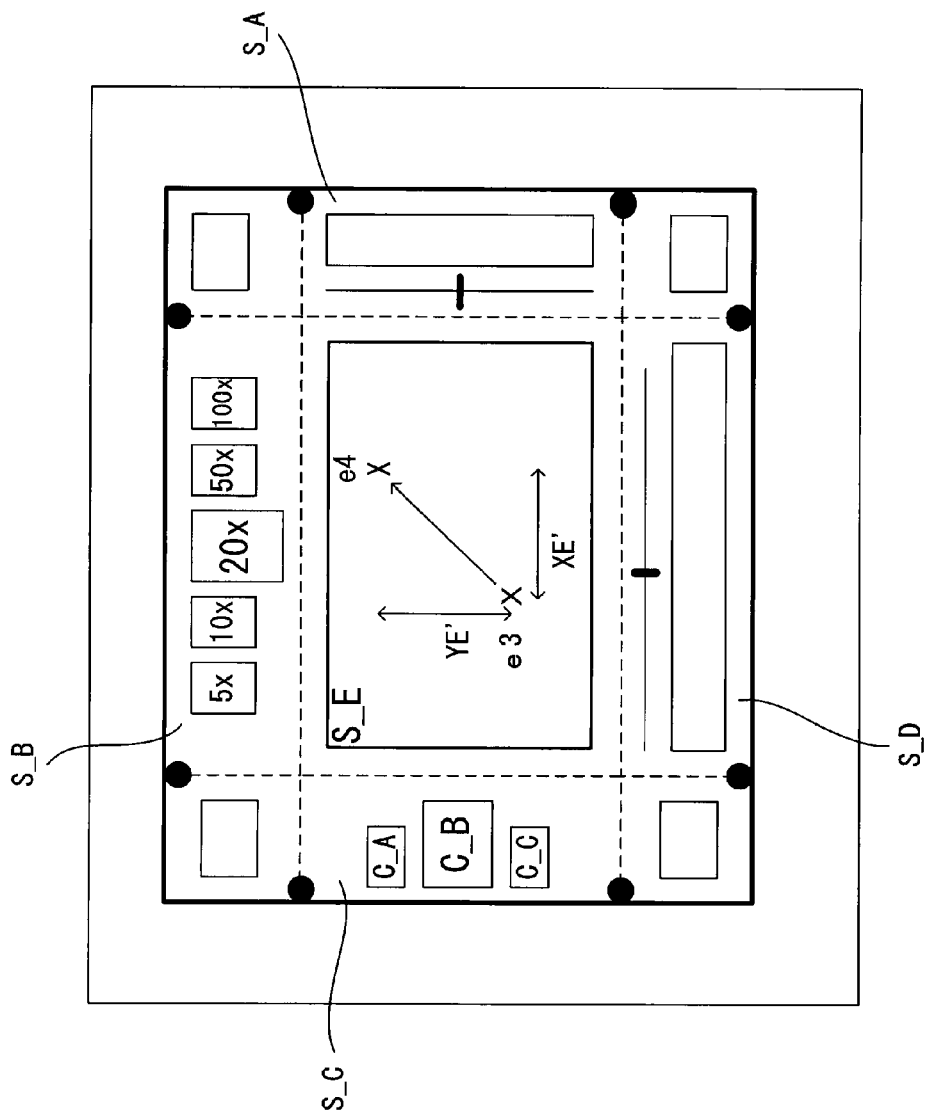
FIG. 24A is an explanatory view (No. 3) of an operation for the functional area S_E to which the function of moving the stage in the X-Y direction is assigned.
Figure 24B:
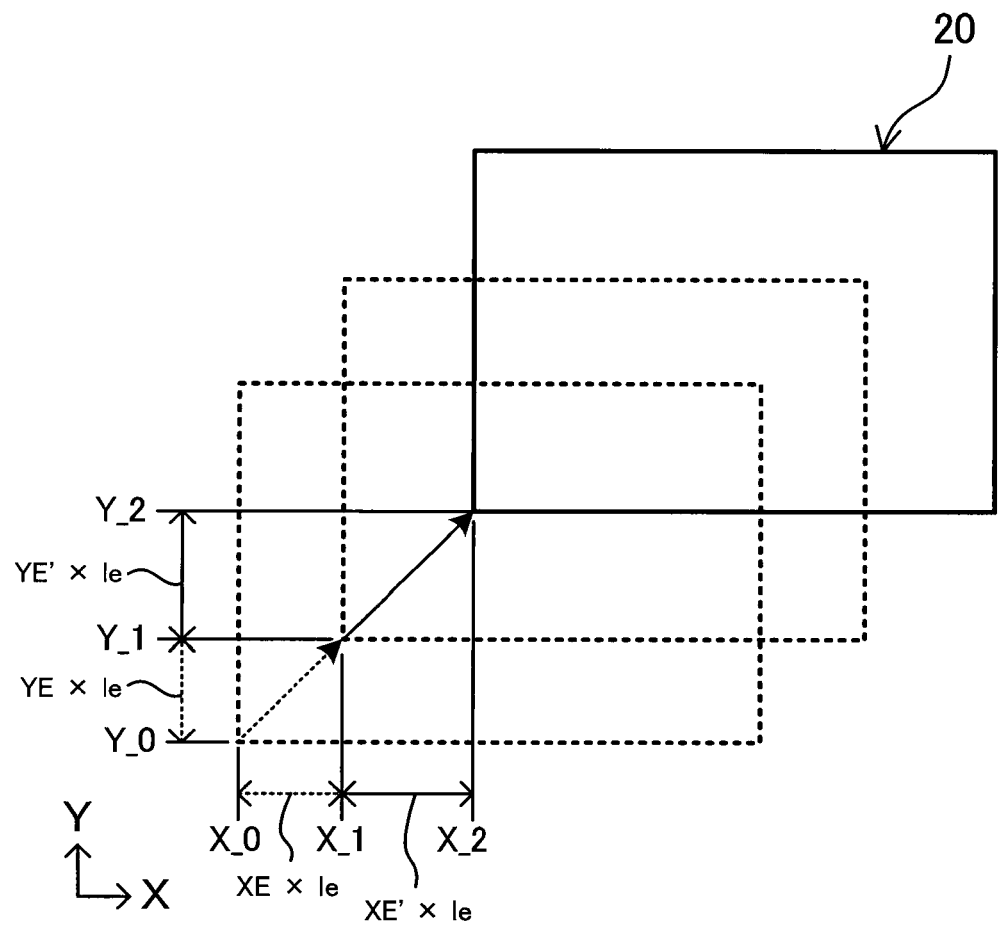
FIG. 24B is an explanatory view (No. 3) of a move of the stage in the X-Y direction as a result of the operation.

Furthermore, a drag operation is performed by a distance XE' in the X direction and by a distance YE' in the Y direction from a point e3 to a point e4 as illustrated in FIG. 24A. Then, a control for moving the stage 20 by a distance XE'×$1e$ from the coordinate X_1 to X_2 in the X direction is performed, and a control for moving the stage 20 by a distance YE'×$1e$ from the coordinate Y_1 to Y_2 in the Y direction is performed (FIG. 24B). During the drag operation, the position of the stage 20 moves with the position being dragged by detecting coordinates being dragged.

Figure 25A:
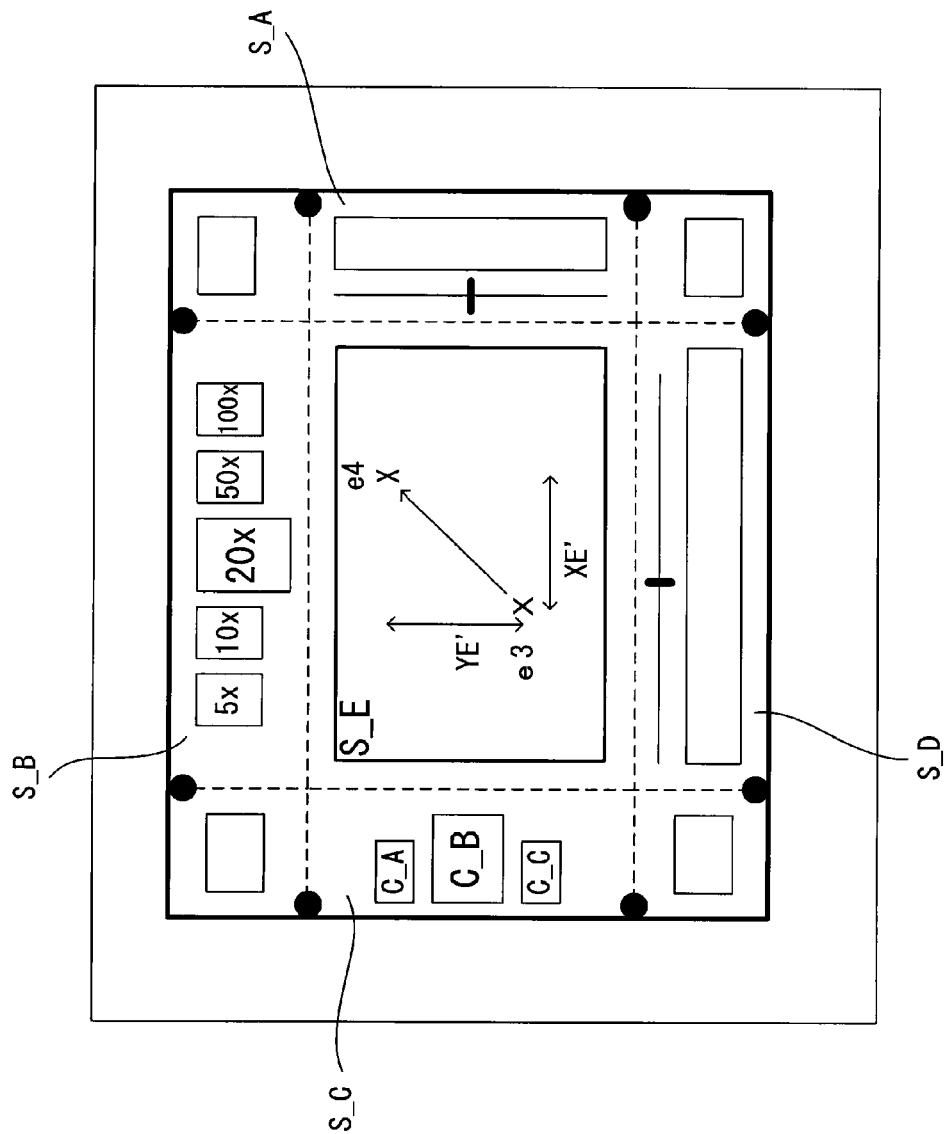
FIG. 25A is an explanatory view (No. 4) of an operation for the functional area S_E to which the function of moving the stage in the X-Y direction is assigned.
Figure 25B:
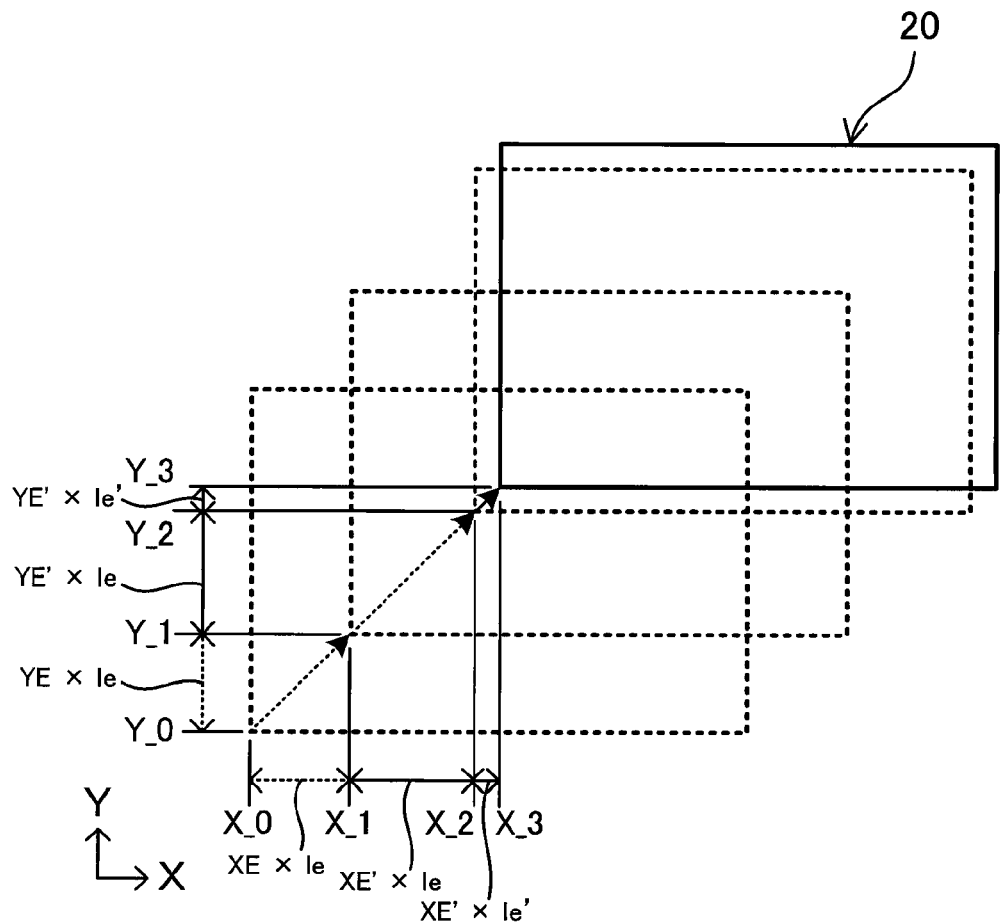
FIG. 25B is an explanatory view (No. 4) of a move of the stage in the X-Y direction as a result of the operation.

A button 304 arranged in the functional area S_F has a function of switching a moving sensitivity of the stage. Namely, when the button 304 is pressed, the coefficient $1e$ is changed to $1e'$. In this embodiment, $1e'$ is a value of one tenth of $1e$. At this time, if a drag operation is performed from the point e3 to the point e4 by a distance XE' in the X direction and by a distance YE' in the Y direction in FIG. 25A after the button 304 is pressed, the moving distance of the stage 20 can be reduced to a distance of one tenth of the moving distance illustrated in FIG. 24B as a slightly moving operation as illustrated in FIG. 25B.

The coefficient $1e$ may be varied according to the objective lens 23 currently inserted in the optical path. Moreover, the coefficient may be automatically set for a drag distance on the touch panel 207 so that the moving distance of the stage 20 when the objective lens 23a with low magnification is inserted becomes longer than that when the objective lens 23b with high magnification inserted, namely, so that the stage 20 moves in a field of view in the same way regardless of lens magnification.

As described above, in the microscope system according to this embodiment, any of the microscope operational functions such as a coordinate, corresponding to a drag operation, of the stage 20 in the Z direction of the system, the amount of dimming of the light source, a magnification, the position of an optical element turret is arranged along the periphery of the touch panel. With this arrangement, various types of operations of the microscope can be implemented by performing a drag operation along the periphery without looking away from the eyepiece lens 26. Moreover, the protruding frame is provided on the surface of the touch panel, and an area enclosed by the protruding frame is assigned an operational function of the stage in the horizontal direction, whereby the operability of the microscope including the stage can be improved.

In the above described embodiment, the functional area S_E is arranged at the center of the touch panel 207 as illustrated in FIGS. 2A, 3A, 4A and 5A. However, the arrangement of the functional area S_E is not limited to this one. The functional area S_E may be arranged, for example, as illustrated in FIGS. 26A and 26B.

Figure 26B:
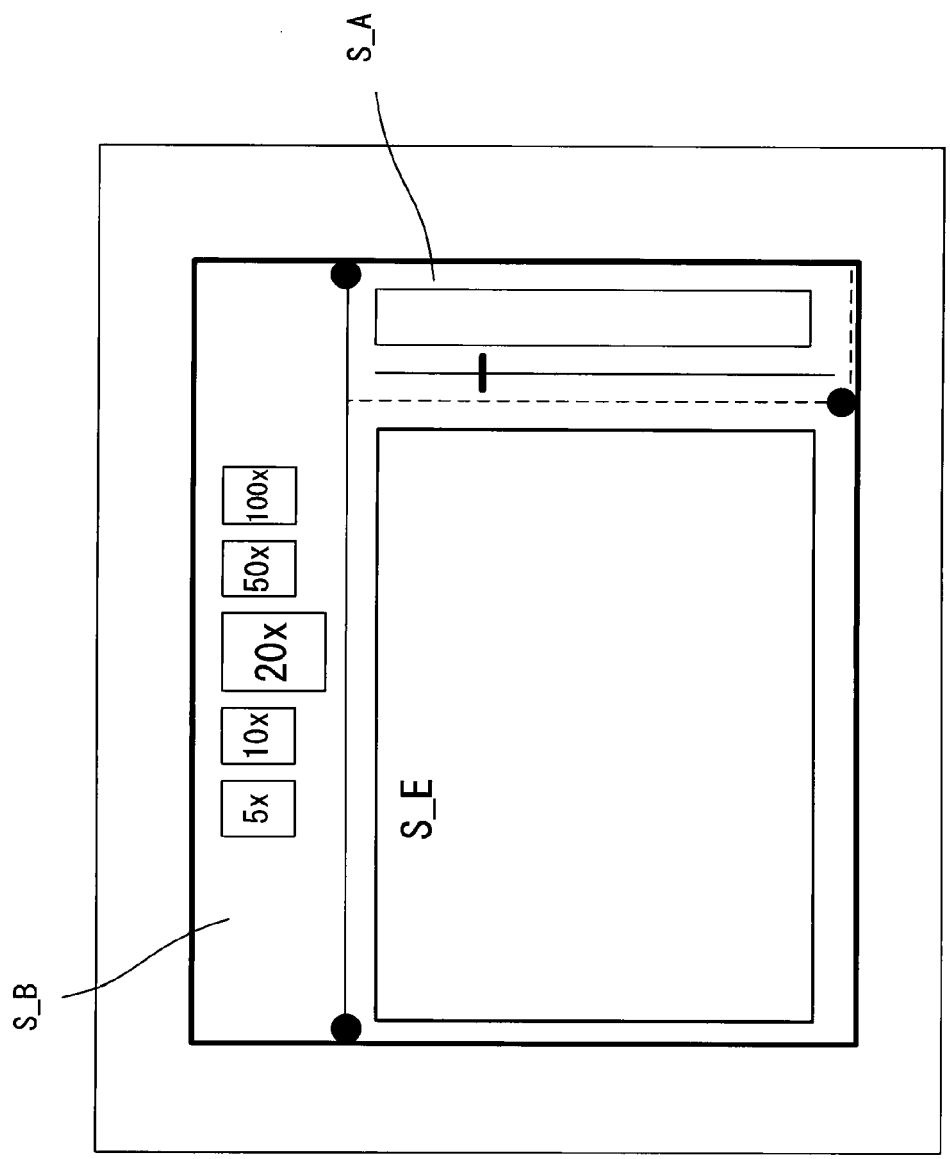
FIG. 26B illustrates an example (No. 2) where the functional area S_E having the operational function of moving the stage in the X-Y direction, the functional area S_A having the operational function of moving the stage in the Z direction, and the functional area S_B having the operational function of switching among the objective lenses are arranged in the periphery of the touch panel.

FIG. 26A illustrates an example (No. 1) where the functional area S_E having the operational function of moving the stage 20 in the X-Y direction, the functional area S_A having the operational function of moving the stage 20 in the Z direction, and the functional area S_B having the operational function of switching among the objective lenses are arranged in the periphery of the touch panel 207. FIG. 26B illustrates an example (No. 2) where the functional area S_E having the operational function of moving the stage 20 in the X-Y direction, the functional area S_A having the operational function of moving the stage 20 in the Z direction, and the functional area S_B having the operational function of switching among the objective lenses are arranged in the periphery of the touch panel 207.

As illustrated in FIGS. 26A and 26B, not only the functional areas S_A and S_B but also the functional area S_E can be arranged in the periphery (restriction frame 209) of the touch panel 207. Such arrangement information can be implemented with the functional area setting information stored in the nonvolatile memory 204 as described with reference to FIG. 7. Namely, coordinates of the functional areas S_A, S_B and S_E are set in the functional area setting information so that these functional areas can be arranged along the restriction frame 209.

In this case, the CPU 201 reads the functional area setting information recorded in the nonvolatile memory 204 into the RAM 203 in S101 of FIG. 7 (S101). The CPU 201 sets the functional areas S_A, S_B and S_E by arranging these functional areas along the restriction frame 209 on the basis of the functional area setting information (S102). Subsequent operations are similar to those described with reference to FIG. 7.

As a result, the stage 20 can be moved in the X-Y direction along the periphery (restriction frame 209) of the touch panel 207. Consequently, the microscope operability of a user can be improved.

The embodiment according to the present invention has been described. However, the present invention is not limited to this embodiment (the above described implementation examples), and may be modified and improved within a scope that does not depart from the gist of the present invention.

For example, an erected microscope apparatus is adopted as the microscope apparatus 1 in the above described microscope system according to the embodiment. However, the present invention is not limited to the inverted microscope apparatus. An inverted microscope apparatus may be adopted. Moreover, this embodiment may be applicable to various types of systems such as a line apparatus including the microscope apparatus.

This embodiment has referred to the changes in the coordinate of the stage 20 in the Z direction, the amount of dimming of the light source, magnifications, and the position of the optical element turret as assignments of the microscope functions. However, this embodiment is not limited to the above described changes in terms of sequentially driving portions of the microscope by continuously performing a drag operation along a positional marker part that is a protrusion or the like for identifying a functional area with a touch. Changes may be made, for example, to a field stop (FS), an aperture stop (AS) or other known motorized portions or units.

This embodiment has referred to the switching among the objective lenses when needed in the microscope apparatus including the plurality of objective lenses. However, this embodiment is not limited to this configuration. For example, zooming may be made when needed in a microscope apparatus including an objective lens having, for example, a zooming mechanism.

Additionally, in this embodiment, the position of a functional area assigned on the touch panel can be identified with a touch by adopting a touch panel provided with a restriction frame, protrusions, and successive level differences. However, the configuration of the present invention is not limited to this embodiment in terms of identifying a functional area on a touch panel. For example, a functional area on a touch panel may be identified with a finger touch of a person by using protrusions arranged at regular intervals, or materials having different frictional coefficients on the touch panel. Moreover, the restriction frame, the protrusions and the like for identifying a functional area may be attachable/detachable to/from the microscope controller 2. Furthermore, a microscope controller having a touch panel is implemented in this embodiment. However, a device having a function equivalent to the touch panel may be replaceable.

According to the present invention, a microscope controller that can improve the microscope operability of a user, and a microscope system including the microscope controller can be provided.

What is claimed is:

1. A microscope system that electrically changes an observation state of a sample, comprising:
    a microscope control unit which controls operations of units configuring the microscope system;
    a touch panel unit which accepts an input made with an external physical contact, and which has a display function; and
    a touch panel controlling unit which sets an image to a predetermined display area of the touch panel unit to set a functional area to operate at least one of the units and which generates a control instruction signal to operate the at least one of the units in accordance with a contact operation upon detection of an input made to the functional area of the touch panel unit by a user,
    wherein the touch panel controlling unit generates the control instruction signal to operate the at least one of the units corresponding to the functional area according to a path taken by the user on the functional area of the touch panel unit from a touch start position to a touch end position, and outputs the control instruction signal to the microscope control unit, and
    wherein the microscope control unit controls an operation of the at least one of the units corresponding to the functional area based on the control instruction signal output from the touch panel controlling unit.

2. The microscope system according to claim 1, further comprising:
    a light source that irradiates the sample;
    a stage on which the sample is mounted; and
    a plurality of objective lenses,
    wherein the at least one unit corresponds to one of:
        a light quantity changing unit which changes a light quantity of the light source,
        a stage Z-direction drive unit which changes a relative distance along a direction of an observation optical axis between one of the objective lenses and the stage,
        an optical zoom unit that changes an observation magnification power of the sample,
        a revolver unit in which the plurality of objective lenses are installed in a switchable manner, and
        a turret unit which arranges an optical element in an observation light path, and
    wherein a state of the at least one unit changes according to the path taken by the user on the touch panel unit from the touch start position to the touch end position.

3. The microscope system according to claim 2, wherein the stage Z-direction drive unit successively changes the distance between the objective lens and the stage in the optical axis direction in proportion to a distance from the touch start position to the touch end position.

4. The microscope system according to claim 2, further comprising a stage XY-direction drive unit which moves the stage in an orthogonal direction with respect to the observation optical axis, and
    wherein the stage XY-direction drive unit successively changes a distance of the stage in the orthogonal direction in proportion to a distance from a touch start position to a touch end position.

5. The microscope system according to claim 4, wherein a movement distance of the stage XY-direction drive unit varies according to a magnification power of the objective lens and the magnification power of the zoom unit.

6. The microscope system according to claim 2, further comprising a positional marker part that is a physical marker at a predetermined position on the touch panel unit.

7. The microscope system according to claim 6, wherein the positional marker part is a frame-shaped convex part that has a predetermined height and is provided along a periphery of the touch panel unit.

8. The microscope system according to claim 7, wherein on the touch panel unit, at least one functional area which operates at least one of the units is arranged with a predetermined range along the positional marker part.

9. The microscope system according to claim 8, wherein at least one function out of:
    (i) changing the light quantity of the light source by the light quantity changing unit, (ii) changing the relative distance along the direction of the observation optical axis between the objective lens and the stage by the stage Z-direction drive unit,
(iii) changing the observation magnification power of the sample by the optical zoom unit,
(iv) switching between the plurality of objective lenses by the revolver unit, and
(v) arranging the optical element in the observation light path by the turret unit,
is assigned to the at least one functional area set along the periphery of the positional marker part.

10. The microscope system according to claim 6, wherein the positional marker part is a level difference formed between a flat surface of the touch panel unit when the touch panel unit is installed at a concave bottom provided on a predetermined surface of a housing of a microscope controller that operates to control the units, and the predetermined surface of the housing.

11. The microscope system according to claim 10, wherein on the touch panel unit, at least one functional area which operates at least one of the units is arranged with a predetermined range along the positional marker part.

12. The microscope system according to claim 11, wherein at least one function out of:
(i) changing the light quantity of the light source by the light quantity changing unit,
(ii) changing the relative distance along the direction of the observation optical axis between the objective lens and the stage by the stage Z-direction drive unit,
(iii) changing the observation magnification power of the sample by the optical zoom unit,
(iv) switching between the plurality of objective lenses by the revolver unit, and
(v) arranging the optical element in the observation light path by the turret unit,
is assigned to the at least one functional area set along the periphery of the positional marker part.

13. The microscope system according to claim 1, further comprising:

first and second positional marker parts that are physical markers at predetermined positions on the touch panel unit,
wherein the touch panel controlling unit successively sets one or more functional areas in predetermined ranges along a periphery of the touch panel unit, and sets a functional area as a central functional area in an area enclosed by the one or more functional areas set along the periphery of the touch panel unit,
wherein the first positional marker part is a first frame-shaped convex part that has a predetermined height and is provided along the periphery of the touch panel unit, or the first positional marker part is a first level difference formed between a flat surface of the touch panel unit when the touch panel unit is installed at a concave bottom provided on a predetermined surface of a housing of a microscope controller that operates to control the units, and the predetermined surface of the housing, and
wherein the second positional marker part is a second frame-shaped convex part that has a predetermined height and is provided on the touch panel unit along a border between the central functional area and the one or more functional areas set along the periphery of the touch panel unit, or the second positional marker part is a second level difference formed between a surface including the central functional area and a surface including the one or more functional areas.

14. The microscope system according to claim 13, wherein one or more protrusions are formed on any of an inner wall side of the first frame-shaped convex part or a side wall of the first level difference, and the second frame-shaped convex part or the second level difference.

15. The microscope system according to claim 14, wherein the second frame-shaped convex part is attachable to and detachable from the touch panel unit.

* * * * *